United States Patent
Aoyama et al.

(10) Patent No.: US 11,945,414 B2
(45) Date of Patent: Apr. 2, 2024

(54) VEHICLE WINDSHIELD WIPER BLADE

(71) Applicant: CANON KABUSHIKI KAISHA, Tokyo (JP)

(72) Inventors: Takehiko Aoyama, Shizuoka (JP); Masanori Yokoyama, Shizuoka (JP); Syoji Inoue, Shizuoka (JP); Arihiro Yamamoto, Shizuoka (JP); Hidekazu Matsuda, Shizuoka (JP); Shota Segawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/158,617

(22) Filed: Jan. 24, 2023

(65) Prior Publication Data

US 2023/0159001 A1 May 25, 2023

Related U.S. Application Data

(63) Continuation of application No. PCT/JP2021/028414, filed on Jul. 30, 2021.

(30) Foreign Application Priority Data

| Jul. 31, 2020 | (JP) | ................................ | 2020-130825 |
| Apr. 30, 2021 | (JP) | ................................ | 2021-077293 |
| Jun. 28, 2021 | (JP) | ................................ | 2021-106577 |

(51) Int. Cl.
*B60S 1/38* (2006.01)
*C08G 18/10* (2006.01)
(Continued)

(52) U.S. Cl.
CPC ................ *B60S 1/38* (2013.01); *C08G 18/10* (2013.01); *C08G 18/163* (2013.01);
(Continued)

(58) Field of Classification Search
CPC ................ B60S 1/38; B60S 2001/3829; B60S 2001/3836; C08L 75/32; C08L 2207/32
(Continued)

(56) References Cited

U.S. PATENT DOCUMENTS

| 9,632,474 B2 | 4/2017 | Yamamoto et al. |
| 9,996,047 B2 | 6/2018 | Kawakami et al. |

(Continued)

FOREIGN PATENT DOCUMENTS

| JP | 2004-243917 A | 9/2004 |
| JP | 2007-253855 A | 10/2007 |

(Continued)

OTHER PUBLICATIONS

International Search Report in International Application No. PCT/JP2021/028414 (dated Oct. 2021).

(Continued)

*Primary Examiner* — Gary K. Graham
(74) *Attorney, Agent, or Firm* — Venable LLP

(57) ABSTRACT

A vehicle windshield wiper blade comprising: a blade support portion; and a lip portion, wherein the lip portion has a tapered portion having a cross section that is taken along a direction perpendicular to the longitudinal direction of the wiper blade and that has a width that gradually decreases from a side closer to the blade support portion towards a direction farthest away from the blade support portion, the lip portion has a tip surface and first and second tapered surfaces constituting the tapered portion, and, in a specific observation region of the first and second tapered surfaces, the average value of the elastic modulus measured at a 0.1 μm pitch is 15-470 MPa and the coefficient of variation of the elastic modulus is at most 17.6%.

10 Claims, 6 Drawing Sheets

(51) Int. Cl.
  *C08G 18/16* (2006.01)
  *C08G 18/18* (2006.01)
  *C08G 18/22* (2006.01)
  *C08G 18/32* (2006.01)
  *C08G 18/42* (2006.01)
  *C08G 18/48* (2006.01)
  *C08G 18/76* (2006.01)
  *C08G 18/77* (2006.01)
  *C08L 75/04* (2006.01)

(52) U.S. Cl.
  CPC ....... *C08G 18/1816* (2013.01); *C08G 18/225* (2013.01); *C08G 18/3206* (2013.01); *C08G 18/4238* (2013.01); *C08G 18/4854* (2013.01); *C08G 18/7664* (2013.01); *C08G 18/7671* (2013.01); *C08G 18/775* (2013.01); *C08L 75/04* (2013.01); *B60S 2001/3829* (2013.01); *B60S 2001/3836* (2013.01); *C08L 2207/32* (2013.01)

(58) Field of Classification Search
  USPC .............................................. 15/250.48, 248
  See application file for complete search history.

(56) References Cited

U.S. PATENT DOCUMENTS

| | | |
|---|---|---|
| 10,088,795 B2 | 10/2018 | Ikeda et al. |
| 2010/0180396 A1* | 7/2010 | Van De Rostyne ...... B60S 1/38 264/161 |
| 2011/0059301 A1 | 3/2011 | Lay et al. |
| 2022/0291622 A1 | 9/2022 | Yamamoto et al. |

FOREIGN PATENT DOCUMENTS

| | | |
|---|---|---|
| JP | 2011-518713 A | 6/2011 |
| JP | 2021-92756 A | 6/2021 |
| WO | 2019/176659 A1 | 9/2019 |
| WO | 2022/025246 A1 | 2/2022 |
| WO | 2022/025262 A1 | 2/2022 |
| WO | 2022/025267 A1 | 2/2022 |
| WO | 2022/025273 A1 | 2/2022 |

OTHER PUBLICATIONS

U.S. Appl. No. 18/158,633 filed Jan. 24, 2023, Segawa et al.
U.S. Appl. No. 18/158,628 filed Jan. 24, 2023, Aoyama et al.
U.S. Appl. No. 18/158,608 filed Jan. 24, 2023, Segawa et al.

* cited by examiner

VEHICLE WINDSHIELD WIPER BLADE

CROSS-REFERENCE TO RELATED APPLICATION

This is a continuation of International Application No. PCT/JP2021/028414, filed on Jul. 30, 2021, and designated the U.S., and claims priority from Japanese Patent Application No. 2020-130825 filed on Jul. 31, 2020, Japanese Patent Application No. 2021-077293 filed on Apr. 30, 2021, and Japanese Patent Application No. 2021-106577 filed on Jun. 28, 2021, the entire contents of which are incorporated herein by reference.

BACKGROUND OF THE INVENTION

Technical Field of the Invention

The present disclosure relates to a vehicle windshield wiper blade that wipes the surface of a member to be cleaned.

Description of the Related Art

For instance automobiles, trains, vessels and aircraft and are provided with cleaning members for the purpose of wiping off water droplets, dirt or the like adhered to glass surfaces such as a windshield and a rear windshield, and ensuring thereby the operator's field of vision. Wiper blades having a wiper blade rubber provided on the portion that comes in contact with the glass surface are well known among such cleaning members. Water droplets and the like adhered to the glass surface can be wiped off through a close-contact motion of the wiper blade rubber over the glass surface. From the viewpoint of ensuring good visibility for the operator, wiper blades are desired that are excellent in wiping ability and that can sufficiently wipe off water droplets, dirt, and the like from glass surfaces.

Japanese Translation of PCT Application No. 2011-518713 discloses that wiping quality can be improved, over the required service life, by forming a coating film containing carbon fibers on the surface of the wiper blade rubber.

SUMMARY OF THE INVENTION

Recent years have witnessed increasingly widespread implementation of water repellent treatments or wax coating for glass surfaces, for the purpose of securing a good field of view. Partial wiping ability is improved as a result, but contact unevenness and vibration may occur in some instances. Noise caused by non-uniform contact may discomfort the operator, while vibration itself may result in impaired wiping ability.

The wiper blade disclosed in Japanese Translation of PCT Application No. 2011-518713 has proven to suffer from fine contact unevenness, depending on the state of dispersion of the added carbon fibers and on the coating state. When the vehicle windshield wiper blade is used in such a state, contact unevenness may occur in connection with wiping performance of water droplets. Meanwhile, conventional wiper blades typified for instance by Japanese Translation of PCT Application No. 2011-518713 may fail to easily wipe dirt off the glass surface in a case where highly adhesive dirt, for instance in the form of dust and oil films such as microparticles and asphalt contained vehicle exhaust gas, is adhered to the glass surface. At least one aspect of the present disclosure is directed to providing a vehicle windshield wiper blade capable of stably bringing out excellent wiping ability and that allows scraping off also highly adhesive dirt, such as dust and oil films, adhered to a member to be cleaned.

According to at least one aspect of the present disclosure, there is provided a vehicle windshield wiper blade, comprising:

a blade support portion; and a lip portion swingably connected to the blade support portion via a neck;

the lip portion having a tapered portion of which, in a cross section in a direction perpendicular to a longitudinal direction of the wiper blade, a width of the lip portion gradually decreases from a side close to the blade support portion towards a direction farthest away from the blade support portion;

the lip portion having a first tapered surface and a second tapered surface that constitute the tapered portion; and a tip surface which, together with the first tapered surface and the second tapered surface, constitutes a first edge and a second edge at a side of the lip portion farthest away from the blade support portion;

assuming that a first line segment is drawn on the first tapered surface parallelly to the first edge at a distance of 10 μm from the first edge;

a length of the first line segment is defined as L1; points at (⅛)L1, (½)L1 and (⅞)L1 from one end side on the first line segment are defined as P0, P1 and P2 respectively; and when measuring, using a scanning probe microscope, an elastic modulus at 70000 points at a 0.1 μm pitch in each of three rectangular observation regions on the first tapered surface, each of the rectangular observation regions having barycenter at P0, P1 and P2, and having a 70 μm-long side parallel to the first line segment and a 10 μm-long side perpendicularly intersecting the first line segment, a mean value of the 210000 obtained elastic modulus values being 15 MPa to 470 MPa, and a coefficient of variation of elastic modulus being 17.6% or lower; and assuming that a second line segment is drawn on the second tapered surface parallelly to the second edge at a distance of 10 μm from the second edge;

a length of the second line segment is defined as L2; points at (⅛)L2, (½)L2 and (⅞)L2 from one end side on the second line segment are defined as P3, P4 and P5 respectively; and when measuring, using a scanning probe microscope, an elastic modulus at 70000 points at a 0.1 μm pitch in each of three rectangular observation regions on the second tapered surface, each of the rectangular observation regions having barycenters at P3, P4 and P5 and having a 70 μm-long side parallel to the second line segment and a 10 μm-long side perpendicularly intersecting the second line segment, a mean value of the 210000 obtained elastic modulus values being 15 MPa to 470 MPa, and a coefficient of variation of elastic modulus being 17.6% or lower.

Further features of the present invention will become apparent from the following description of exemplary embodiments with reference to the attached drawings.

DESCRIPTION OF THE EMBODIMENTS

In the present disclosure, the descriptions of "XX or more and YY or less" or "XX to YY" representing numerical ranges mean numerical ranges including the lower and upper limits, which are endpoints, unless otherwise specified. When numerical ranges are stated stepwise, the upper and lower limits of each numerical range can be combined arbitrarily.

The inventors found that in order to enhance the wiping ability against highly adhesive dirt such as dust and oil films it is effective to control, so as to lie within a specific range, the elastic modulus, and coefficient of variation thereof, of a specific portion of a tapered portion that comes in contact with the member to be cleaned.

Configuration of a Vehicle Windshield Wiper Blade

A vehicle windshield wiper blade according to one aspect of the present disclosure (hereafter also simply referred to as a wiper blade) is used in equipment such as transportation equipment, for instance vehicle typified by automobiles, and also airplanes and vessels, as well as industrial equipment such as construction equipment.

Figure 1:
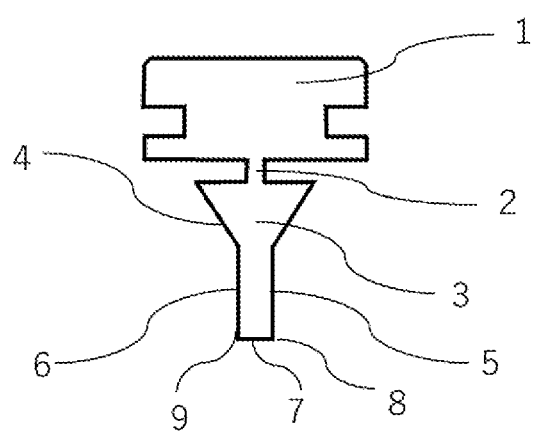
FIG. 1 is an example of a schematic diagram of a wiper blade.

As illustrated in FIG. 1, a vehicle wiper blade for wiper devices of a vehicle windshield is provided with a blade support portion 1, and a lip portion 3 swingably connected to the blade support portion via a neck 2. The wiper blade is formed to have a substantially uniform cross-sectional shape in a longitudinal direction.

The lip portion 3 has a tapered portion 4 in which the width of a cross section of the of the lip portion 3 in a direction perpendicular to the longitudinal direction decreases gradually, from the side close to the blade support portion 1, in a direction bearing away from the blade support portion 1.

The wiper blade cleans the surface of a member to be cleaned, such as a glass surface, in that a portion of the tapered portion is brought into contact with the surface of the member to be cleaned.

For instance, the width of the neck 2 may set to be narrower than that of the blade support portion 1 and the lip portion 3, in a cross section perpendicular to the longitudinal direction of the wiper blade.

Figure 2:
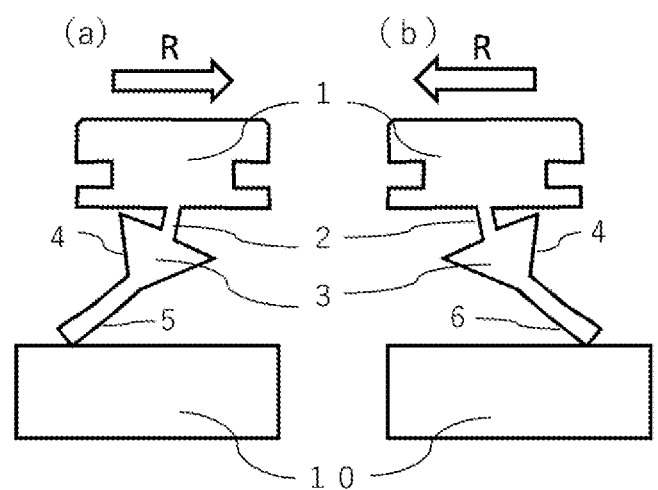
FIG. 2 is an explanatory diagram illustrating a state in a cleaning process of a wiper blade.

Therefore, as illustrated in FIG. 2, the lip portion 3 tilts in the wiping direction, as part of the tapered portion is brought into contact with the member to be cleaned.

(a) and (b) of FIG. 2 are explanatory diagrams illustrating states during the cleaning process of the wiper blade.

Figure 3:
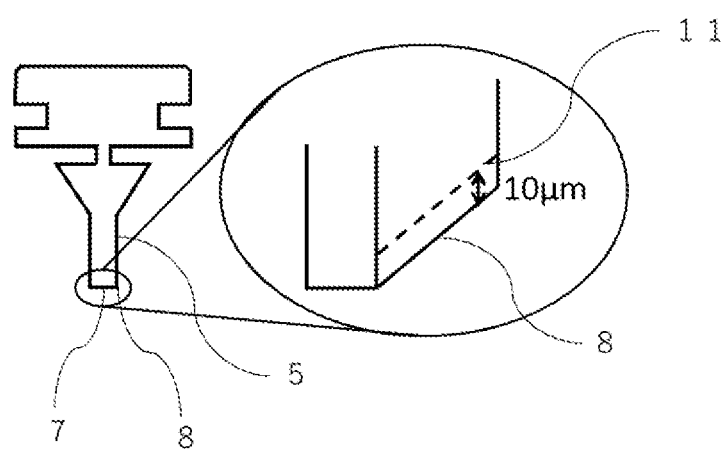
FIG. 3 is an enlarged-view diagram of the vicinity of a first edge.

In (a) of FIG. 2, the lip portion 3 of the wiper blade has: a first tapered surface 5 and a second tapered surface 6, on the reverse side from that of first tapered surface 5, that constitute the tapered portion 4 and that come into contact with the member to be cleaned 10; and a tip surface 7 which, together with the first tapered surface 5 and the second tapered surface 6, constitutes a first edge 8 and a second edge 9, of the lip portion 3, lying farthest away from the blade support portion 1 (see FIG. 1 and FIG. 3 concerning the first edge, the second edge and the tip surface).

In (b) of FIG. 2, the lip portion 3 of the wiper blade has the second tapered surface 6, and the first tapered surface 5 on the reverse side from that of the second tapered surface 6, and that constitute the tapered portion 4 that comes in contact with the member to be cleaned 10; and the tip surface 7 which, together with the first tapered surface 5 and the second tapered surface 6, constitutes the first edge 8 and the second edge 9, of the lip portion 3, lying farthest away from the blade support portion 1 (see FIG. 1 and FIG. 3 concerning the first edge, the second edge and the tip surface). The arrows R indicate the cleaning direction of the wiper blade. The surface in contact with the member to be cleaned becomes switched from the first tapered surface 5 to the above second tapered surface 6 as a result of switching from cleaning in the direction of arrow R in (a) of FIG. 2 to cleaning in the direction of arrow R in (b) of FIG. 2.

FIG. 3 is an enlarged-view diagram of the vicinity of the first edge 8.

As illustrated in FIG. 3, at the tip of the wiper blade that comes in contact with the member to be cleaned, it is assumed that a first line segment 11 is drawn on the first tapered surface 5 parallelly to the first edge 8 at a distance of 10 μm from the first edge 8. Herein L1 denotes the length of the first line segment.

Figure 4:
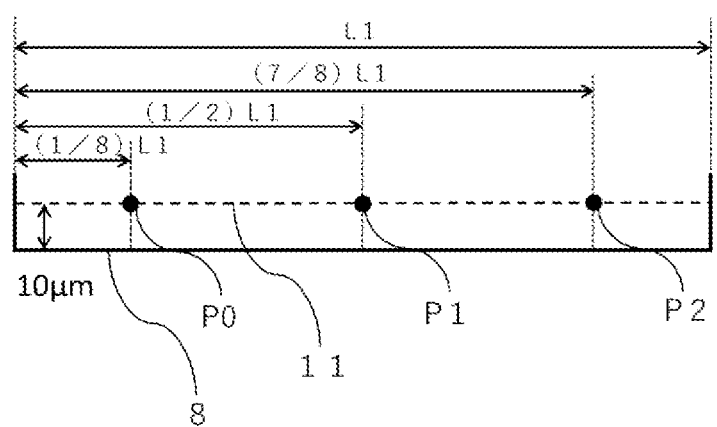
FIG. 4 is an enlarged-view diagram of the vicinity of a first line segment.

FIG. 4 is an enlarged-view diagram of the vicinity of the first line segment. As illustrated in FIGS. 4, P0, P1 and P2 denote points at (⅛)L1, (½)L1 and (⅞)L1 from one end side on the first line segment 11, respectively.

Herein there are set, on the first tapered surface 5, three rectangular observation regions 12 having a 70 μm-long side parallel to the first line segment and a 10 μm-long side perpendicularly intersecting the first line segment 11, and having respective barycenters at P0, P1 and P2 on the first line segment.

Figure 5:
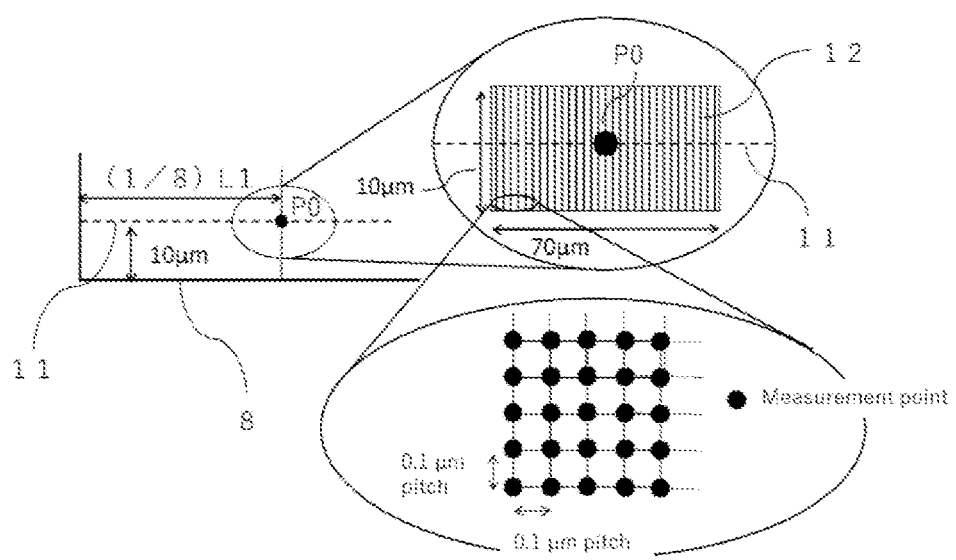
FIG. 5 is an enlarged-view diagram of the vicinity of an observation region 12 having a barycenter at P0.

FIG. 5 illustrates an enlarged-view diagram of the vicinity of the observation region 12 having P0 as the barycenter thereof.

The elastic modulus of the first tapered surface at 70000 points at a pitch (spacing) of 0.1 μm for each of the three observation regions, including both P1 and P2, was measured, similarly to P0 in FIG. 5, using a scanning probe microscope (hereafter referred to as SPM).

The mean value of a total of 210000 elastic modulus values that were obtained is from 15 MPa to 470 MPa, and the coefficient of variation of the elastic modulus is 17.6% or lower.

At the tip of the wiper blade in contact with the member to be cleaned, there is assumed to draw a second line segment on the second tapered surface 6, parallelly to the second edge 9 and at a distance of 10 μm from the second edge 9, similarly to the measurement on the first tapered surface. Herein L2 denotes the length of the second line segment.

Further, P3, P4 and P5 respectively denote points at (⅛)L2, (½)L2, and (⅞)L2 from one end side on the second line segment.

Herein there are set, on the second tapered surface 6, three rectangular observation regions, having a 70 μm-long side parallel to the second line segment and a 10 μm-long side perpendicularly intersecting the second line segment, and having respective barycenters at P3, P4 and P5 on the second line segment.

The elastic modulus of the second tapered surface was measured at 70000 points at a pitch (spacing) of 0.1 μm for each of the three observation regions, using an SPM.

The mean value of a total of 210000 elastic modulus values that were obtained is from 15 MPa to 470 MPa, and the coefficient of variation of the elastic modulus is 17.6% or lower.

The behavior of the reciprocating wiper blade during cleaning was observed in detail. As a result it was found that the wiper blade bearing on the member to be cleaned at the time of cleaning came into contact with the member to be cleaned at a region that included positions at about 10 μm from the first edge and from the second edge, on the first tapered surface and on the second tapered surface. The wiper blade according to the present disclosure allows preventing the occurrence of wiping streaks and uneven wiping at a wiped portion of the member to be cleaned by virtue of the fact that the mean value of elastic modulus in the longitudinal direction of each region that can constitute the above contact portion with the member to be cleaned, and the coefficient of variation of that elastic modulus, satisfy predetermined stipulations.

In the wiper blade according to at least one aspect of the present disclosure, a mean of elastic modulus values measured at 10-μm positions from the first edge and the second edge on the first tapered surface and the second tapered surface and at predetermined sites in the longitudinal direction at regions in the vicinity of the 10-μm positions, and which can constitute a contact portion of contact with the member to be cleaned, is from 15 MPa to 470 MPa, and the coefficient of variation of the elastic modulus is 17.6% or lower. The mean value of the above elastic modulus is preferably from 32 MPa to 62 MPa. The coefficient of variation of the elastic modulus is preferably 6.0% or lower. The coefficient of variation of the elastic modulus is preferably as small as possible, and accordingly the lower limit is not particularly restricted, but is for instance 0.1% or higher.

In a case where the mean of elastic modulus values lies within the above ranges, part of the tapered surface can be brought into contact with the member to be cleaned within a narrow width, over the longitudinal direction of the wiper blade, at the time of cleaning. That is, the contact portion can be caused to approximate line contact, with pressing forces concentrating on the contact portion, and such that deposits can be reliably scraped off, and not simply wiped off or spread out, from the member to be cleaned. As a result very high wiping ability can be brought out as compared with conventional wiper blades.

A feature wherein the coefficient of variation of the elastic modulus is 17.6% or lower signifies herein that the elastic modulus of the tapered surface at the contact portion is more uniform or more homogeneous in the longitudinal direction of the tapered surface. Thereby, the wiper blade can be brought into contact with the member to be cleaned over a narrow width along the longitudinal direction of the blade. In consequence this allows bringing out uniform hugging ability and contactability with the member to be cleaned, while suppressing the occurrence of vibration and the like, and without waviness of the surface to be cleaned in the longitudinal direction of the wiper blade at the time of cleaning. Excellent wiping ability, free of wiping streaks and uneven wiping, can therefore be elicited stably, in all regions of the wiper blade in the longitudinal direction, against highly adhesive dirt, such as dust and oil films, that sticks to the member to be cleaned.

The coefficient of variation of the elastic modulus is calculated in accordance with Formula (1) below.

$$\text{Coefficient of variation (\%)} = \text{standard deviation}/\text{mean of elastic modulus values} \times 100 \quad \text{Formula (1)}$$

For instance when a wiper blade is pressed against a member to be cleaned according to an automotive measurement standard, the contact angle is about 25° in the vicinity of the contact portion, the width (nip width) of the contact portion with the member to be cleaned is from 20 to 30 μm, and contact pressure is 1.5 MPa at a maximum, in the case of conventional wiper blades for vehicle.

By contrast the wiper blade of the present disclosure yields measured values that include a contact angle of about 55°, a nip width from 5 to 6 μm, and a contact pressure of 6.0 MPa.

Figure 6:
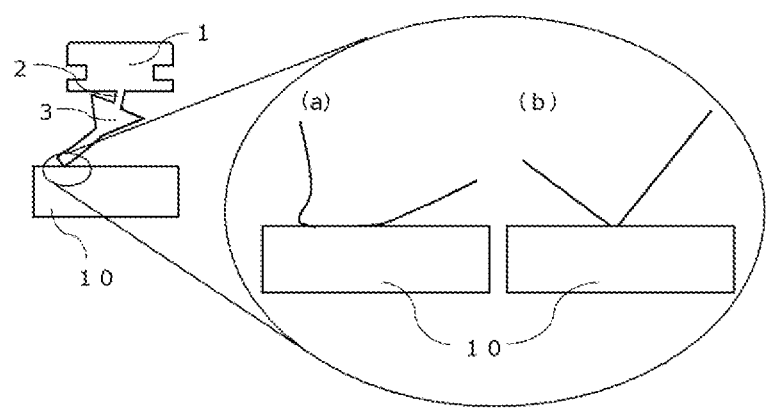
FIG. 6 is a schematic diagram of the vicinity of a contact portion of a wiper blade with a member to be cleaned.

FIG. 6 illustrates a schematic diagram of the vicinity of the contact portion of the wiper blade with the member to be cleaned.

As (a) of FIG. 6 reveals, a conventional wiper blade abuts the member to be cleaned with the tapered surface in a flat contact state (surface contact). By contrast, the wiper blade of the present disclosure is found to come into edge contact with the member to be cleaned, with the tapered surface in a state that approximates line contact, as illustrated in (b) of FIG. 6.

The material that constitutes the tapered portion is not particularly limited, so long as it is a material that can form a contact portion that comes in contact with the member to be cleaned, and such that the mean of elastic modulus values and the coefficient of variation of the elastic modulus in the vicinity of 10-μm positions from the first edge and from the second edge, at the first tapered surface and of the second tapered surface, conforms to the above stipulations. Specifically, for instance the tapered portion preferably contains a polyurethane that exhibits excellent mechanical characteristics and readily meets the above stipulations pertaining to the mean value and coefficient of variation of elastic modulus.

Also, the above polyurethane is preferably a polyurethane elastomer. A polyurethane elastomer is obtained mainly from raw materials such as polyols, chain extenders, polyisocyanates, catalysts and other additives. The above polyurethane elastomer is a block copolymer made up of hard segments and soft segments. The hard segments are ordinarily made up of chain extenders such as polyisocyanates and short-chain diols. Soft segments are ordinarily made up of polyisocyanates and long-chain polyols such as polyester polyols, polyether polyols or polycarbonate polyols.

For instance the characteristics of the block copolymer made up of the above hard segments and soft segments may be exploited in order to achieve the above mean value of elastic modulus and in order to regulate of the coefficient of variation of the elastic modulus.

Conventional polyurethanes have hard segments in which portions resulting from aggregation derived from urethane bond interactions are in turn further aggregated with each other. Aggregated portions of urethane bond portions have comparatively large hard segments that result from further aggregation. Studies by the inventors have revealed that, as a result, a wiper blade produced using such a polyurethane does not satisfy at least one from among the mean of elastic modulus values and the coefficient of variation of elastic modulus according to the present disclosure. That is, conventional polyurethanes have relatively large hard segments, and hence it is difficult to bring the coefficient of variation of the elastic modulus at 210000 sites to be lower than 17.6%, in scanning probe microscopy, as in the present disclosure. It is deemed that further aggregation of the aggregated portions of urethanes bond can be suppressed, and the coefficient of variation can be kept small, in the case of a polyurethane having a small amount of hard segments themselves. In that case, however, it is difficult to set the mean of elastic modulus values to be 15 MPa or larger.

A tapered portion satisfying the physical properties according to the present disclosure can be formed for instance by using a polyurethane in which hard segments are finely and uniformly dispersed. Such a polyurethane is explained below.

Specifically, a polyurethane is obtained that results from fine and uniform dispersion of hard segments, with suppressed hard segment aggregation, through the use of urethane raw materials in the form of a diisocyanate or trifunctional or higher polyfunctional isocyanate and a diol or trifunctional or higher polyfunctional alcohol, within appropriate concentration ranges.

Specifically, preferably there is used for instance at least one from among an alcohol including a trifunctional or higher polyfunctional alcohol and an isocyanate compound including a trifunctional or higher polyfunctional isocyanate, as urethane raw materials.

Also preferable is to use an alcohol including at least one selected from among diols and trifunctional or higher polyfunctional alcohols, and an isocyanate compound including a trifunctional or higher polyfunctional isocyanate, as urethane raw materials.

Likewise preferable is to use an alcohol including a trifunctional or higher polyfunctional alcohol, and an isocyanate compound including a diisocyanate and a trifunctional or higher polyfunctional isocyanate, as urethane raw materials.

Particularly preferably, a trifunctional or higher polyfunctional isocyanate and a trifunctional or higher polyfunctional alcohol are used as urethane raw materials.

A polyurethane obtained as a reaction product of a trifunctional or higher polyfunctional isocyanate and a trifunctional or higher polyfunctional alcohol exhibits suppressed molecular orientation, on account of steric hindrance, such that hard segment aggregation is yet more reliably suppressed. As a result, the polyurethane is a suitable polyurethane in terms of achieving the elastic modulus and coefficient of variation according to the present disclosure.

Also, crystallinity is enhanced, through stacking of soft segments, in a case where soft segment moieties have for instance a linear alkylene structure. Hard segments do not readily disperse as a result. Accordingly, also introduction of an alkylene structure having a side chain portion into the soft segment moieties is herein effective in suppressing hard segment aggregation. Specifically, for instance introduction of substructures such as those represented by the following Structural formulae (i) to (iv) into soft segment moieties between two urethane bonds is effective in terms of making hard segments smaller.

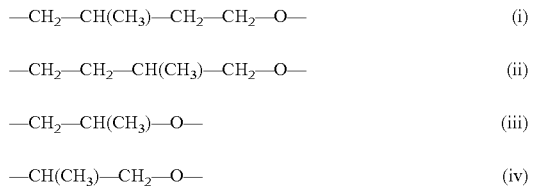

The structures in Structural formulae (i) and (ii), which are substantially identical, result from ring-opening polymerization of 3-methyltetrahydrofuran. The structures in Structural formulae (iii) and (iv), which are substantially identical, result from ring-opening polymerization of 1,2-propylene oxide. A urethane resin having these structures between two adjacent urethane bonds can be obtained herein by causing a polyether polyol or polyester polyol having these structures to react with an isocyanate. It is ordinarily difficult to achieve fine dispersion of hard segments in a case where a bifunctional alcohol (diol) and a bifunctional isocyanate (diisocyanate) are used as urethane raw materials. However, hard segments can be finely dispersed, even when using a diol and a diisocyanate, by introducing the above substructures into the soft segment moieties. A polyurethane can be obtained as a result that yields a wiper blade satisfying the parameters according to the present disclosure.

Methods for suppressing crystallization derived from soft segment stacking and preventing hard segment aggregation, other than by introducing side chains into soft segment moieties, as described above, include for instance methods that involve utilizing two or more types of alcohol having straight-chain portions having dissimilar numbers of carbon atoms, as the alcohol among the urethane raw materials. In polyurethanes obtained by using two or more types of straight-chain portions with dissimilar numbers of carbon atoms, crystallization derived from stacking of soft segments can be suppressed by virtue of the fact that the numbers of carbon atoms are dissimilar, also when the soft segment moieties have a straight-chain alkylene structure. Given that the number of carbon atoms in the soft segment moieties are dissimilar, aggregation of urethane bond portions is suppressed thereby, which as a result allows preventing hard segment aggregation. Therefore, the hard segments can be made smaller also in a case where a diisocyanate and a diol having a straight-chain alkylene structure in the molecule are utilized as urethane raw materials, by using herein, as the above diol, a plurality of diols having different numbers of carbon atoms in the straight-chain alkylene structure. A polyurethane can be obtained as a result that yields a wiper blade satisfying the parameters according to the present disclosure. Examples of multiple types of diol include for instance a concomitant use of a polybutylene adipate polyester polyol and a polyhexylene adipate polyester polyol.

Examples of the above alcohol include the following.

Polyester polyols such as polyethylene adipate polyester polyol, polybutylene adipate polyester polyol, polyhexylene adipate polyester polyol, (polyethylene/polypropylene) adipate polyester polyol, (polyethylene/polybutylene) adipate polyester polyol and (polyethylene/polyneopentylene) adipate polyester polyol; polycaprolactone-based polyols obtained through ring-opening polymerization of caprolactone; polyether polyols such as polyethylene glycol, polypropylene glycol and polytetramethylene ether glycol; as well as polycarbonate diol. The foregoing may be used singly or in combinations of two or more types.

There are preferably used two or more types of polyol having straight-chain portions (alkylene chains) with dissimilar numbers of carbon atoms, as described above, since in that case a urethane is obtained in which soft segment crystallization is inhibited and hard segment aggregation is suppressed. In this case there are preferably used for instance at least two selected from the group consisting of polyester polyols such as polyethylene adipate polyester polyol, polybutylene adipate polyester polyol, polyhexylene adipate polyester polyol, (polyethylene/polypropylene) adipate polyester polyol, (polyethylene/polybutylene) adipate polyester polyol and (polyethylene/polyneopentylene) adipate polyester polyol.

A diol or trifunctional or higher polyfunctional alcohol capable of extending polyurethane elastomer chains may be used as the above chain extender.

Examples of diols include the following.

Ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (terephthalyl alcohol) and triethylene glycol. The foregoing may be used singly or in combinations of two or more types.

Examples of the trifunctional or higher polyfunctional alcohol include trimethylolpropane (TMP), glycerin, pentaerythritol and sorbitol. The foregoing may be used singly or in combinations of two or more types.

One method for increasing the elastic modulus of polyurethane elastomers may involve for instance introducing a crosslinked structure. A preferred method for introducing crosslinking involves using a trifunctional or higher polyfunctional alcohol as the above chain extender. Introducing a branched structure into a polyurethane by using a trifunctional or higher polyfunctional alcohol allows herein suppressing polyurethane crystallization and further suppressing hard segment aggregation. Preferably, a trifunctional alcohol is used as the polyfunctional alcohol, from the viewpoint of suppressing excessive increases in hardness derived from an excessively high degree of crosslinking of the polyurethane. Preferred among the foregoing are triols, since these have a methylene skeleton adjacent to a hydroxyl group, can yield a flexible crosslinked structure in the molecular structure, and elicit the effect of further suppressing hard segment crystallinity. Examples of such triols include for instance trimethylolpropane (TMP) and glycerin.

Examples of the above isocyanate compound include the following.

4,4'-diphenylmethane diisocyanate (4,4'-MDI), polymeric MDI, 2,4-tolylene diisocyanate (2,4-TDI), 2,6-tolylene diisocyanate (2,6-TDI), xylene diisocyanate (XDI), 1,5-naphthylene isocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylene diisocyanate (TMXDI), carbodiimide-modified MDI, triphenylmethane-4,4',4"-triisocyanate (TTI) and tris(phenylisocyanate)thiophosphate (TPTI).

Preferred among the foregoing is 4,4'-MDI, since the two isocyanate groups thereof have commensurate reactivity, and the compound affords high mechanical characteristics. Preferably, a trifunctional or higher polyfunctional isocyanate is used concomitantly. Using herein a trifunctional or higher polyfunctional isocyanate allows introducing a branched structure into the polyurethane, and is effective in terms of further suppressing hard segment aggregation. Moreover, a denser crosslinked structure can be introduced into the polyurethane, and hence contactability of an elastic portion against the member to be cleaned can be made more stable. It becomes possible as a result to effectively suppress wiping streaks and uneven wiping in the member to be cleaned.

Examples of the trifunctional or higher polyfunctional isocyanate include at least one selected from the group consisting of triphenylmethane-4,4',4"-triisocyanate (TTI), tris(phenylisocyanate)thiophosphate (TPTI) and polymeric MDI. Among the foregoing, tris(phenylisocyanate) thiophosphate (TPTI) and polymeric MDI can be used more suitably. These isocyanates have a methylene group or an ether group between multiple NCO groups, such that distances between multiple urethane bonds can be maintained properly. These isocyanates are accordingly advantageous in terms of suppressing hard segment aggregation.

Polymeric MDI is represented by the following Chemical formula (1) and Chemical formula (1)'. In Chemical formula (1)', n is preferably from 1 to 4. Chemical formula (1) is an instance where n is 1 in Chemical formula (1)'.

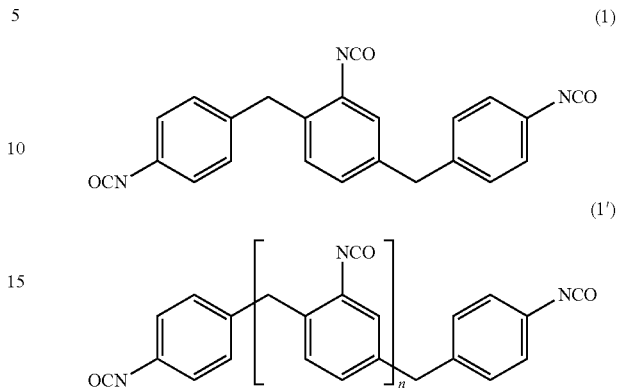

Preferably, the tapered portion according to the present disclosure exhibits the below-described physical properties in a case where the tapered portion contains a polyurethane which is a reaction product of a raw material composition that contains an isocyanate compound including a diisocyanate and a trifunctional or higher polyfunctional isocyanate, and an alcohol including a trifunctional or higher polyfunctional alcohol.

Specifically, it is assumed that respective line segments are drawn on the first tapered surface and the second tapered surface of the tapered portion, parallelly to the first edge and to the second edge, at a distance of 0.5 mm from the first edge and the second edge. With L' as the length of each line segment, P0', P1', P2' denote points at $\frac{1}{8}$L', $\frac{1}{2}$L', $\frac{7}{8}$L' from one end side on the line segment, respectively.

Respective samples having been sampled at the above P0', P1' and P2' on the first tapered surface and the second tapered surface are heated up to 1000° C. at a ramp rate of 10° C./s, using a mass spectrometer of direct sample introduction type in which a sample is heated and vaporized within an ionization chamber, and sample molecules are ionized. Herein M1 denotes the detected amount of all ions obtained as a result, and M2 denotes a peak integrated intensity in an extracted ion thermogram corresponding to a range of an m/z value derived from the trifunctional or higher polyfunctional isocyanate. Preferably, M2/M1 at the first tapered surface and/or second tapered surface ranges from 0.0010 to 0.0150, and particularly preferably M2/M1 is from 0.0030 to 0.0150.

With M3 as the peak integrated intensity in an extracted ion thermogram corresponding to a range of an m/z value derived from a diisocyanate, M3/M1 at the first tapered surface and/or second tapered surface ranges preferably from 0.0200 to 0.1100, and particularly preferably from 0.0380 to 0.0760. By virtue of the fact that M2/M1 and M3/M1 lie within the above ranges, an appropriate amount of a low-crystallinity structure derived from the trifunctional or higher polyfunctional isocyanate becomes introduced into the polyurethane; as a result, hard segment aggregation can be suppressed, and hard segments can be dispersed more finely and more uniformly. In addition, development of the crosslinked structure in the polyurethane can be prevented from becoming excessive, and the mean value of elastic modulus can be easily adjusted to lie in the range from 15 MPa to 470 MPa.

Preferably M2/M3 is set to lie in the range from 0.0130 to 0.3000. Herein M2/M3 is a parameter denoting the ratio of structural portions derived from a diisocyanate and structural portions derived from a trifunctional or higher polyfunctional isocyanate, in the structure derived from an isocyanate in the polyurethane, such that by setting M2/M3 to lie in the above range a polyurethane can be obtained in which excessive rises in elastic modulus can be curtailed and hard segment aggregation can be further suppressed.

In a case where the polyurethane is a polyurethane produced using polymeric MDI represented by Chemical formula (1)' above, as a trifunctional or higher polyfunctional isocyanate, M2 may be set to the total of peak integrated intensities corresponding to a range where an m/z value derived from n=1 in the structure represented by Chemical formula (1)' is from 380.5 to 381.5, a range where an m/z value derived from n=2 is from 511.5 to 512.5, a range where an m/z value derived from n=3 is from 642.5 to 643.5, and a range where an m/z value derived from n=4 is from 773.5 to 774.5, in an extracted ion thermogram obtained through mass spectrometry described above.

In a case where the polyurethane is a polyurethane in which 4,4'-MDI represented by Chemical formula (2), used as a diisocyanate, is utilized as one of the raw materials, M3 may be set to a peak integrated intensity corresponding to a range where an m/z value derived from a structure represented by Chemical formula (2) is from 249.5 to 250.5.

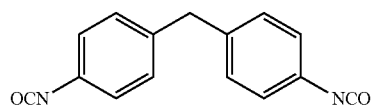

(2)

Preferably, the tapered portion of the wiper blade according to one aspect of the present disclosure has the physical properties below in a case where the tapered portion contains a polyurethane that is a reaction product of a raw material composition that contains an isocyanate compound including a trifunctional or higher polyfunctional isocyanate, and an alcohol including a trifunctional or higher polyfunctional alcohol. Specifically, in respective line segments assumed to be drawn on the first tapered surface and the second tapered surface of the tapered portion, parallelly to the first edge and to the second edge and at a distance of 0.5 mm from the first edge and the second edge, and with L' as the length of each line segment, P0', P1' and P2' respectively denote points at ⅛L', ½L' and ⅞L' from one end side on the line segment. Samples having been sampled at each of the above P0', P1' and P2' on the first tapered surface and the second tapered surface are measured by pyrolysis GC/MS (gas chromatography and mass spectrometry). The concentration of the component derived from the trifunctional or higher polyfunctional alcohol in the polyurethane ranges preferably from 0.04 mmol/g to 0.39 mmol/g, more preferably from 0.14 mmol/g to 0.39 mmol/g, and yet more preferably from 0.22 mmol/g to 0.39 mmol/g.

Hard segment aggregation in the polyurethane can be suppressed yet more reliably in a case where the concentration of the component derived from the trifunctional or higher polyfunctional alcohol is 0.04 mmol/g or higher. Also, an excessive development of a crosslinked structure in the polyurethane can be suppressed, and the elastic modulus can be prevented from becoming excessively high, by virtue of the fact that the concentration of the component derived from the trifunctional or higher polyfunctional alcohol is 0.39 mmol/g or lower. Therefore, a tapered portion having the above physical properties can more easily satisfy the above stipulations pertaining to the mean of elastic modulus values (15 to 470 MPa) and coefficient of variation of the elastic modulus (17.6% or lower). The concentration of the trifunctional or higher polyfunctional alcohol in the polyurethane is calculated in accordance with Formula (2) below.

Concentration of trifunctional or higher polyfunctional alcohol (mmol/g)=[amount (g) of trifunctional or higher polyfunctional alcohol/molecular weight of trifunctional or higher polyfunctional alcohol×1000]/[polyurethane mass (g)]   Formula (2)

The urethane raw materials can contain a catalyst for promoting the reaction of the isocyanate compound and the alcohol. Ordinarily used catalysts for polyurethane elastomer curing can be used as the catalyst; examples thereof include tertiary amine catalysts, and specifically the amines exemplified below. Aminoalcohols such as dimethylethanolamine, N,N,N'-trimethylaminopropylethanolamine and N,N'-dimethylhexanolamine; trialkylamines such as triethylamine; tetraalkyldiamines such as N,N,N'N'-tetramethyl-1,3-butanediamine; as well as triethylenediamine, piperazine-based compounds and triazine-based compounds. Organic acid salts of metals, such as potassium acetate and potassium octylate alkali, can also be used. Metal catalysts ordinarily used in urethanization, for instance dibutyltin dilaurate, can likewise be used. The foregoing may be used singly or in combinations of two or more types.

The raw materials that constitute the tapered portion of the wiper blade may have formulated therein, as needed, pigments, plasticizers, waterproofing agents, antioxidants, ultraviolet absorbers, light stabilizers and so forth, within ranges that do not affect elastic modulus or the coefficient of variation thereof, of the tapered portion.

Surface Treatment

The tapered portion of the wiper blade may be subjected to a surface treatment. Preferred surface treatment methods in the present disclosure include for instance (i) a method having a step of projecting ultraviolet rays onto an object to be treated, and (ii) a method having a step of coating an object to be treated with a material for cured region formation, and curing the material.

(i) The conditions for irradiation with ultraviolet rays are not particularly limited. The wavelength of the ultraviolet rays may be 400 nm or shorter, but is preferably 200 nm or longer. The elastic modulus can be increased effectively if the wavelength of the ultraviolet rays is 200 nm or longer. Preferably, the wavelength of the maximum emission peak of light emitted by a light source is from 200 nm to 400 nm. Particularly preferably, the wavelength for the maximum emission peak lies around 254 nm, for instance in the range of 254±1 nm. That is because ultraviolet rays within the above wavelength region, or of the above wavelength, can efficiently generate active oxygen, which modifies the surface of the tapered portion of the wiper blade. In a case where there is a plurality of emission peaks of ultraviolet rays, preferably one of the peaks is present in the vicinity of 254 nm.

The intensity of the light emitted from the light source is not particularly limited and can take on a value as measured using for instance a spectroradiometer (product name: USR-40 V/D, by Ushio Inc.) or an accumulated UV meter (product name: UIT-150-A, UVD-5254, VUV-S172 or VUV-5365, by Ushio Inc.). The accumulated light intensity of ultraviolet rays projected onto the tapered portion of the wiper blade in the surface treatment step may be selected as appropriate depending on the surface treatment effect that is to be obtained. Irradiation with light from the light source can be carried out for instance depending on the irradiation duration, the output of the light source and the distance to the light source, and for instance it may be prescribed that a desired accumulated light intensity be obtained, for example of 10000 mJ/cm².

The accumulated light intensity of ultraviolet rays projected onto the tapered portion of the wiper blade can be calculated in accordance with the following method.

Accumulated light intensity (mJ/cm²) of ultraviolet rays=ultraviolet ray intensity (mW/cm²)×irradiation duration (sec)

For instance a high-pressure mercury lamp or a low-pressure mercury lamp can be suitably used as the light source for emitting ultraviolet rays. These light sources are preferable, since they can stably emit ultraviolet rays having a suitable wavelength, with little attenuation derived from irradiation distance, and allow for uniform whole-surface irradiation.

(ii) The conditions for applying and curing the material for cured region formation are not particularly limited. The cured region in the tapered portion can be formed through application and curing of the material for cured region formation. This treatment allows effectively increasing the elastic modulus of the cured portion through application of the material for cured region formation. Preferably, the cured region is formed on both faces of the first tapered surface and the second tapered surface, of the lip portion, that come in contact with the member to be cleaned.

The material for cured region formation can be used after being diluted with a diluting solvent as needed, and can be applied by resorting to means such as dipping, spraying, dispenser coating, brush coating, roller coating or the like. Application of the material for cured region formation may be followed by a heating treatment. Preferably, the material for cured region formation is impregnated into the polyurethane contained in an elastic member. Impregnation is promoted herein by increasing the concentration, and lowering the viscosity, of the material for cured region formation, so that as a result the material for cured region formation may be heated and impregnated without being diluted. The degree of curing may be adjusted for instance depending on the duration of impregnation or immersion, the heating treatment temperature and heating treatment time after impregnation or immersion, and/or a subsequent standing time.

The temperature of the material for cured region formation may be set to range from about 60° C. to 90° C. The impregnation or immersion time cannot be prescribed categorically, but ranges preferably from about 10 seconds to 180 seconds. A heating treatment may be performed after application of the material for cured region formation onto the cured region. The viscosity of the material for cured region formation that is present on the surface of the polyurethane becomes lowered as a result of the heating treatment; in turn, this allows promoting permeation and diffusion of the material into the polyurethane.

The heating method is not particularly limited, and may be a method that involves passing through a heating furnace or a method that involves blowing a hot air current. Heating furnaces include for instance radiant heating furnaces and circulating air heating furnaces, while devices for forming hot air currents include hot air blowers and far infrared heaters.

The cured region is made wider by setting heating conditions to high temperature and/or long duration. Among preferred heating conditions, the surface temperature of the treated surface is set for instance to lie in the range from 90° C. to 110° C. Preferably, the heating time is for instance set to lie in the range of 10 minutes to 60 minutes.

In addition, the amount of residual isocyanate during polyurethane molding tends to gradually decrease with time after molding. Therefore, though not limited thereto, the cured region may be formed immediately after molding of the polyurethane. For instance, the cured region may be formed within 3 hours after polyurethane molding. The amount of residual isocyanate can be adjusted also on the basis of the mixing ratio of the composition used at the time of formation of the polyurethane.

The material for cured region formation is not particularly limited so long as it allows the polyurethane to be cured, and a cured region to be formed on the surface of polyurethane.

Examples of the material include isocyanate compounds and acrylic compounds. The material for cured region formation may be used after having been diluted with a solvent or the like. The solvent used for dilution is not particularly limited so long as it dissolves the material that is used, and examples thereof include toluene, xylene, butyl acetate, methyl isobutyl ketone and methyl ethyl ketone.

In a case where the constituent material of the tapered portion of the wiper blade is a polyurethane, an isocyanate compound being a constituent material of polyurethanes is more preferably used as the material that forms the cured region, in terms of compatibility and impregnation with the tapered portion material. Isocyanate compounds having one or more isocyanate groups in the molecule can be used herein as the isocyanate compound.

Examples of isocyanate compounds having one isocyanate group in the molecule include aliphatic monoisocyanates such as octadecyl isocyanate (ODI) and aromatic monoisocyanates such as phenylisocyanate (PHI).

As an isocyanate compound having two isocyanate groups in the molecule there may be used compounds ordinarily utilized in the production of polyurethane resins; examples of such compounds include the following. 2,4-tolylene diisocyanate (2,4-TDI), 2,6-tolylene diisocyanate (2,6-TDI), 4,4'-diphenylmethane diisocyanate (MDI), m-phenylene diisocyanate (MPDI), tetramethylene diisocyanate (TMDI), hexamethylene diisocyanate (HDI) and isophorone diisocyanate (IPDI).

For instance 4,4',4"-triphenylmethanetriisocyanate, 2,4,4'-biphenyltriisocyanate, 2,4,4'-diphenylmethanetriisocyanate or the like can be used as an isocyanate compound having three or more isocyanate groups in the molecule.

The isocyanate compounds having two or more isocyanate groups can also be used in the form of modified derivatives or multimers thereof. Herein MDI exhibiting high crystallinity, i.e. a symmetrical structure, is preferred in order to efficiently increase the elastic modulus of the cured region; more preferred, in terms of workability, is MDI including a modified product, since MDI is then liquid at normal temperature.

Method for Producing a Wiper Blade

The method for producing the wiper blade is not particularly limited, and can be selected from among known methods. For instance a polyurethane elastomer raw material composition can be injected into the cavity of a molding mold for wiper blades, whereupon the composition is cured through heating, to thereby yield a lip portion having a tapered portion. The tip of the tapered portion may be shaped by being cut. Doing so is preferable since in that case the first edge and the second edge can be molded with high smoothness. Alternatively, a pair of tandem-shaped molded products may be produced in forms so that the tapered portions are in contact while facing each other, the molded products being then cut in the longitudinal direction to produce respective wiper blades. The blade support portion and the neck may be produced in accordance with conventionally known materials and relying on conventionally known production methods.

Overall Process Including a Wiper Arm

The wiper blades of the present disclosure can be used in various types of wiper systems, for instance of tandem type or of opposed wiping type.

According to at least one aspect of the present disclosure, it can be obtained that a vehicle windshield wiper blade that is capable of stably bringing out excellent wiping ability and that allows scraping off also highly adhesive dirt, such as dust and oil films, adhered to a member to be cleaned.

EXAMPLES

The present disclosure will be explained below by way of production examples, working examples and comparative examples, but the disclosure is not limited in any way by these examples. Reagents or industrial chemicals were used as raw materials, besides those listed in the examples and comparative examples. Unless otherwise specified, the language "parts" in the examples and comparative examples refers to mass basis throughout.

Wiper blades were produced and evaluated in examples and comparative examples. Tables 3 to 9 set out the formulations and evaluation results of the examples and comparative examples.

Example 1

Preparation of Starting Materials for Wiper Blades

Herein 352.6 g of 4,4'-diphenylmethane diisocyanate (product name: Millionate MT, by Tosoh Corporation (hereafter 4,4'-MDI, and simply "MDI" in the tables)), 10.0 g of triphenylmethane-4,4',4"-triisocyanate (product name: Ultite Super CA, by Toho Kasei Kogyo Co. Ltd.) (hereafter referred to as TTI), as a trifunctional or higher polyfunctional isocyanate, and 637.4 g of a polybutylene adipate polyester polyol having a number-average molecular weight of 2500 (product name: Nippollan 3027, by Tosoh Corporation) (hereafter referred to as PBA2500), were caused to react at 80° C. for 3 hours, to yield a prepolymer having an NCO content of 10.0 mass %. The components given in Table 1 below were then mixed to prepare a curing agent.

TABLE 1

| Material | Amount |
|---|---|
| 1,4-butanediol (by Tokyo Chemical Industry Co., Ltd.) (*hereafter "1,4-BD") | 7.0 g |
| Pentaerythritol as trifunctional or higher polyfunctional alcohol (by Tokyo Chemical Industry Co., Ltd.) | 26.6 g |
| Polyhexylene adipate polyester polyol as a diol (product name: Nippollan 164, by Tosoh Corporation, number average molecular weight 1000) (*hereafter "PHA1000") | 246.3 g |
| Polycat 46 (product name, by Air Products and Chemicals, Inc.) | 0.13 g |

TABLE 1-continued

| Material | Amount |
|---|---|
| N,N'-dimethylhexanolamine (product name: Kaolizer No. 25, by Kao Corporation) (*hereafter "No. 25") | 0.55 g |

This curing agent was added to the prepolymer described above and the whole was mixed, to yield a raw material composition. This raw material composition was injected into a molding mold for wiper blades and was cured at a temperature of 130° C. for 2 minutes. This was followed by demolding, to yield a polyurethane molded product. Herein a Release agent A was applied beforehand onto the interior of the molding mold for wiper blades. The Release agent A is a mixture of the materials given in Table 2 below.

TABLE 2

| Material | Amount |
|---|---|
| [ELEMENT14 PDMS 1000-JC] (product name, by Momentive Performance Materials Inc.) | 5.06 g |
| [ELEMENT14 PDMS 10K-JC] (product name, by Momentive Performance Materials Inc.) | 6.19 g |
| [SR1000] (product name, by Momentive Performance Materials Inc.) | 3.75 g |
| [EXXSOL DSP145/160] (product name, by Andoh Parachemie Co., Ltd.) | 85 g |

A wiper blade according to the present example was obtained by cutting the tip end side of the lip portion of the obtained polyurethane molded product. The distances of the lip portion tip in the thickness direction and in the longitudinal direction were set to 0.6 mm and 450 mm, respectively. The obtained wiper blade was evaluated in accordance with the following methods.

Method for Measuring the Concentration of a Polyfunctional Alcohol Species

Polyfunctional alcohols were detected by pyrolysis GC/MS (gas chromatography and mass spectrometry). The measurement conditions are set out below.

Sampling positions: in respective line segments assumed to be drawn on the first tapered surface and the second tapered surface of the tapered portion, parallelly to the first edge and to the second edge and at a distance of 0.5 mm from the first edge and the second edge, and with L' as the length of each line segment, the sampling positions were set at P0', P1' and P2', respectively, at ⅛L', ½L' and ⅞L' from one end side on the line segment.

Samples having been respectively sampled at the above P0', P1' and P2' on the first tapered surface and the second tapered surface were measured in accordance with the method below. In the above sampling, members of polyurethane or the like were cut using a biocutter.

Device:

Pyrolyzer: product name: EGA/PY-3030D, by Frontier Laboratories Ltd.

Gas chromatography device: TRACE 1310 gas chromatograph, by Thermo Fisher Scientific Inc.

Mass spectrometer: ISQLT, by Thermo Fisher Scientific Inc.

Pyrolysis temperature: 500° C.

GC column: stainless steel capillary column having 0.25 mm inner diameter×30 m

Stationary phase: 5% phenylpolydimethylsiloxane

Temperature rise conditions: holding at 50° C. for 3 minutes, and heating up to 300° C. at 8° C./minute MS conditions: mass number range m/z from 10 to 650

Scanning speed: 1 sec/scan

Polyfunctional alcohol species were characterized by GC/MS. A calibration curve was prepared through GC analysis of known concentrations of a qualitatively characterized polyfunctional alcohol species, and the species was quantified on the basis of GC peak area ratios. The arithmetic mean value of numerical values obtained for the respective samples at the above P0', P1' and P2', at the first tapered surface and the second tapered surface, were taken as the polyfunctional alcohol concentration at the first tapered surface and at the second tapered surface.

Measurement of M1, M2 and M3

Herein M1 to M3 were measured relying on a direct sample introduction method (DI method) in which the sample is introduced directly into an ion source, bypassing a gas chromatograph (GC).

The apparatus used herein was an ion trap-type GC/MS (product name: POLARIS Q, by Thermo Fisher Scientific Inc.), with a direct exposure probe (DEP) being used as a direct introduction probe.

In respective line segments assumed to be drawn on the first tapered surface and the second tapered surface of the tapered portion, parallelly to the first edge and to the second edge and at a distance of 0.5 mm from the first edge and the second edge, and with L' as the length of each line segment, the sampling positions were set at P0', P1' and P2', respectively, at ⅛L', ½L' and ⅞L' from one end side on the line segment.

Samples having been respectively sampled at the above P0', P1' and P2' on the first tapered surface and the second tapered surface were measured in accordance with the method below. At the time of sampling, members of polyurethane or the like were cut using a biocutter.

About 0.1 μg of each of the samples having been sampled at each of the above P0', P1' and P2', at the first tapered surface and the second tapered surface, were fixed to a filament positioned at the tip of the probe, and the whole was directly inserted into an ionization chamber. This was followed by rapid heating from room temperature up to 1000° C. at a constant ramp rate (about 10° C./s), whereupon the resulting vaporized gas was detected using a mass spectrometer.

The total of the integrated intensity of all peaks in an obtained total ion current thermogram was taken as a detected amount M1 of all ions.

Further, (M2/M1) was calculated using the above values of M1 and M2, where M2 is the total of peak integrated intensities in an extracted ion thermogram of an m/z value derived from the trifunctional or higher polyfunctional isocyanate. Further, (M3/M1) was calculated using values of M1 and M3, where M3 is the total of peak integrated intensities in an extracted ion thermogram of an m/z value derived from the diisocyanate. The arithmetic mean values of numerical values obtained from respective samples at P0', P1' and P2' at the first tapered surface and the second tapered surface were taken as respective values of (M2/M1) and (M3/M1).

In the present example TTI, used as the trifunctional or higher polyfunctional isocyanate, has the structure represented by Chemical formula (3) below. In the extracted ion thermogram obtained in the present evaluation there was detected a peak derived from a cation product of TTI having a peak top at an m/z position from 366.5 to 367.5. In the in the present example, therefore, this peak integrated intensity was taken as M2.

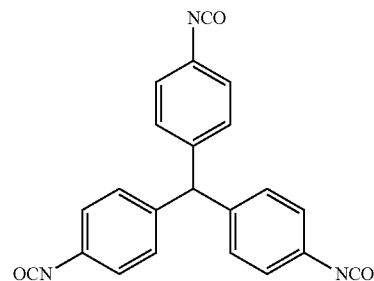

(3)

In another example described below, peaks derived from cation products of polymeric MDI, having peak tops at positions in a range where an m/z value denoting n=1 was from 380.5 to 381.5, a range where an m/z value denoting n=2 was from 511.5 to 512.5, a range where an m/z value denoting n=3 was from 642.5 to 643.5, and a range where an m/z value denoting n=4 was from 773.5 to 774.5, of the structure represented by Chemical formula (1)', were detected in an extracted ion thermogram obtained in the present evaluation, for the elastic portion made up of a polyurethane synthesized using polymeric MDI as the trifunctional or higher polyfunctional isocyanate. Therefore, the total of peak integrated intensities was taken as M2, in the above example.

Similarly, tris(phenylisocyanate)thiophosphate (TPTI), used as the trifunctional or higher polyfunctional isocyanate in a below-described example, has a structure represented by Chemical formula (4). In the extracted ion thermogram obtained in the present evaluation there was detected a peak derived from a cation product of TPTI having a peak top at an m/z position from 464.5 to 465.5. Therefore, the total of the peak integrated intensities was taken as M2, in the above example.

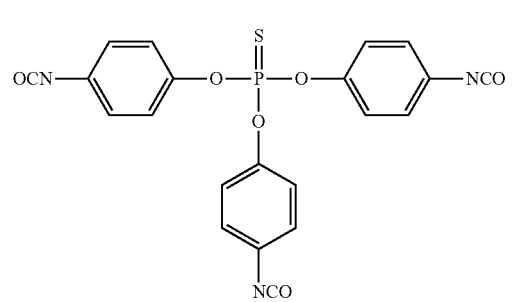

(4)

In the case by contrast of 4,4'-MDI, which is a diisocyanate, a structure represented by Chemical formula (2) above was cationized and detected, in a range from 249.5 to 250.5 of m/z, of the structure represented by Chemical formula (2) and derived from 4,4'-MDI. The peak integrated intensity of the extracted ion thermogram corresponding to this structure was taken as (M3).

Method for Measuring Elastic Modulus

Elastic modulus by SPM was measured in accordance with the method below, using a scanning probe microscope (SPM) (product name: MFP-3D Origin, by Oxford Instruments plc).

Firstly, samples were prepared as follows. A first tapered surface and a first edge formed at the tip surface were set, as illustrated in FIG. 3, for each obtained wiper blade, and upon hypothetical drawing of a first line segment of length L1, parallelly to the first edge and at a distance of 10 μm from the first edge, there were cut out three 2 mm² square measurement samples having one side parallel to the first line segment and having respective barycenters at points P0, P1 and P2 at ⅛L1, ½L1 and ⅞L1 from one end side on the line segment. A cryomicrotome (UC-6 (product name), by Leica Microsystems GmbH) was used to cut out, from the above measurement samples, respective 100 μm² polyurethane flakes having a thickness of 1 μm, in a −50° C. state, having one side parallel to the first line segment and having respective barycenters set to P0, P1 and P2. Three measurement samples were thus prepared. Each obtained measurement sample was placed on a smooth silicon wafer and was allowed to stand in an environment at room temperature of 25° C. and humidity of 50%, for 24 hours.

Next, the silicon wafer having the measurement sample placed thereon was set on an SPM stage, and an SPM observation was performed. The spring constant and proportionality constant of a silicon-made cantilever (product name: OMCL-AC160, by Olympus Corporation, tip curvature radius: 8 nm) were ascertained beforehand in accordance with a thermal noise method with an SPM device, as follows (spring constant: 30.22 nN/nm, proportionality constant: 82.59 nm/V).

The cantilever was tuned beforehand, and resonance frequencies of the cantilever were determined (285 KHz (first order) and 1.60 MHz (higher order)).

The measurement mode of the SPM was an AM-FM mode, the free amplitude of the cantilever was set to 3 V, the set point amplitude was set to 2 V (first order) and 25 mV (higher order), and scanning was carried out under conditions of scanning speed of 1 Hz, and 256 vertical and 256 horizontal scanning points, in a field of view that was 70 μm×70 μm in size, to acquire a phase image. The position of the field of view was selected so that P0, P1 and P2 of each measurement sample was present in the center of the field of view, and one side of the field of view was parallel to the first line segment.

A site of each measurement sample where the elastic modulus was to be measured was designated as a result of force curve measurement, on the basis of the obtained phase image. Specifically, measurement sites were designated in the form of positions corresponding to 70000 points at a 0.1 μm pitch (spacing), transversally and longitudinally, in rectangular regions having respective barycenters at P0, P1 and P2, and having a 70 μm-long side parallel to the first line segment and a 10 μm-long side that perpendicularly intersects the first line segment, within a 70 μm×70 μm phase image, as illustrated in FIG. 4 and FIG. 5.

Thereafter, force curve measurement in contact mode was performed once per point, for all points. Force curve acquisition was conducted under the following conditions. In the force curve measurement a piezoelectric element which is the drive source of the cantilever is controlled so that the tip of the cantilever snaps back once deflection derived from contact with the sample surface takes on a constant value. The snap-back point at this time is referred to as a trigger value that denotes the specific extent of voltage increase, from the deflection voltage at the start of the force curve, at which the cantilever snaps back. In the present measurement force curves were measured with the trigger value set to 0.2 V. As other force curve measurement conditions, the distance from the tip position of the cantilever in a standby state up to snap-back of the cantilever at the trigger value was set to 500 nm, and scanning speed (speed at which the probe reciprocates once) was set to 1 Hz. Thereafter, fitting based on the Hertz theory was applied to the obtained force curves, one by one, to calculate the elastic modulus. The elastic modulus (Young's modulus) according to the Hertz theory is calculated in accordance with the following Formula (*1).

$$F=(4/3)E^* R^{1/2} d^{3/2} \qquad \text{Formula (*1)}$$

Herein, F denotes the force exerted on the sample by the cantilever at the point in time at which the cantilever snaps back, E* is the composite modulus of elasticity, R is the radius of curvature (8 nm) of the tip of the cantilever, and d is the extent of deformation the sample at the point in time at which the cantilever snaps back.

Further, d was calculated from Formula (*2) below.

$$d=\Delta z - D. \qquad \text{Formula(*2)}$$

Herein, Δz is the amount of displacement of the piezoelectric element from the point in time at which the tip of the cantilever touches the sample until the tip snaps back, and D is the amount of warp of the cantilever at the point in time at which the cantilever snaps back. Further, D was calculated on the basis of Formula (*3) below.

$$D=\alpha \cdot \Delta V \text{deflection} \qquad \text{Formula (*3)}$$

In Formula (*3), α is the proportionality constant (involute constant) of the cantilever, and ΔVdeflection is the amount of change in deflection voltage from that when the cantilever starts touching the sample until the point in time at which the cantilever snaps back.

Further, F was calculated on the basis of Formula (*4) below.

$$F=\kappa \cdot D \qquad \text{Formula (*4)}$$

In the formula, κ is the spring constant of the cantilever.

Herein ΔV deflection and Δz are actually measured values, and hence E* in Formula (*1) was worked out on the basis of Formulae (*1) to (*4). The elastic modulus (Young's modulus) Es to be obtained was calculated on the basis of Formula (*5) below.

$$1/E^*=[(1-Vs^2)/Es]-[(1-Vi^2)/Ei] \qquad \text{Formula (*5)}$$

Vs: Poisson's ratio of the sample (fixed at 0.33 in the present example);

Vi: Poisson's ratio of the cantilever tip (the value for silicon was used in the present example);

Ei: Young's modulus of the cantilever tip (the value for silicon was used in the present example).

Elastic modulus was measured at 70000 points at a 0.1 μm pitch (spacing), transversally and longitudinally, in rectangular observation regions (three 10 μm×70 μm observation regions) having respective barycenters at P0, P1 and P2, and having a 70 μm-long side parallel to the first line segment and a 10 μm-long side that perpendicularly intersects the first line segment. Then the mean of elastic modulus values calculated from force curves for the total of 210000 points was taken as the elastic modulus of the first tapered surface.

A standard deviation was calculated from the elastic modulus of the total of 210000 points. The coefficient of variation of the elastic modulus of the first tapered surface was calculated on the basis of Formula 1 below, from the mean of elastic modulus values and the standard deviation.

Coefficient of variation (%)=standard deviation/mean of elastic modulus values×100      Formula (1)

The mean of elastic modulus values of the second tapered surface and the coefficient of variation of the elastic modulus of the second tapered surface were calculated in the same way as above. The results are given in Table 3.

Evaluation of Wiping Performance

The wiping ability of the wiper blade was evaluated using a test device for wiping performance testing set forth in Japanese Industrial Standards (JIS) D5710:1998 (Automotive parts—Wiper arms and wiper blades). In this test a wiper blade was attached and a silicone oil (product name: KF-96-50cs, by Shin-Etsu Chemical Co., Ltd.) was applied to the entire surface to be wiped, in a state thus simulating an oil film on a glass surface as the member to be cleaned; cleaning then was then performed under the conditions below.

After one reciprocation of the wiper blade, the unwiped state on the glass surface was observed from the rear side of the surface to be cleaned, and the influence on gloss unevenness and visibility were assessed visually. The results were calculated in the form of the ratio (hereafter referred to as silicone oil film removal area ratio (%)) of the surface area from which the silicone oil film was removed relative to the surface area of the surface wiped by the wiper blade.

Wiping performance was evaluated in accordance with the criteria below, on the basis of the calculated oil film removal area ratio. These results were taken as the initial wiping performance. Further, the wiper blade was caused to reciprocate under the durability conditions below, and durable wiping performance was ascertained, after 100,000 reciprocations and 500,000 reciprocations, in the same way as in the evaluation of the initial wiping performance. Table 3 sets out the results of the initial evaluation and durability evaluation, as the wiping performance of the wiper blade.

Wiping Conditions

Load applied to wiper blade: 10 N/m

Wiping reciprocating speed of wiper blade: 50 reciprocations/min Durability Test Conditions Amount of water applied: 100 to 500 mL/min Load applied to wiper blade: 18 N/m Wiping reciprocating speed of wiper blade: 50 reciprocations/min Evaluation Criteria Rank A: silicone oil film removal area ratio of 95% or higher Rank B: silicone oil film removal area ratio from 90% to less than 95%

Rank C: silicone oil film removal area ratio from 85% to less than 90%

Rank D: silicone oil film removal area ratio from 80% to less than 85%

Rank E: silicone oil film removal area ratio lower than 50%

Examples 2 to 10

Wiper blades were produced and evaluated in the same way as in Example 1 but herein the types and use amounts of the various materials for the prepolymer and the types and use amounts of the various materials for the curing agent were as given in Table 3.

In Example 3 tris(phenylisocyanate)thiophosphate (product name: Ultite Super CAII, by Toho Kasei Kogyo Co., Ltd.) (hereafter referred to as TPTI) was used as the trifunctional or higher polyfunctional isocyanate for the prepolymer.

In Example 5 polymeric MDI (product name: Millionate MR-400, by Tosoh Corporation) (hereafter referred to as MR400) was used as the trifunctional or higher polyfunctional isocyanate for the prepolymer.

In Example 6 glycerin (Tokyo Chemical Industry Co., Ltd.) was used as the polyfunctional alcohol for the curing agent.

Examples 11 to 20

Wiper blades were produced and evaluated in the same way as in Example 1 but herein the types and use amounts of the various materials for the prepolymer and the types and use amounts of the various materials for the curing agent were as given in Table 4.

In Example 13 trimethylolpropane (by Tokyo Chemical Industry Co., Ltd.) (hereafter referred to as TMP) was used as the polyfunctional alcohol for the curing agent.

In Example 14 polymeric MDI (product name: Millionate MR-200, by Tosoh Corporation) (hereafter referred to as MR200) was used as the polyfunctional isocyanate for the prepolymer.

In Example 18 a polybutylene adipate polyester polyol (product name: Nippollan 4009, by Tosoh Corporation) (hereafter referred to as PBA1000) was used as the polyol for the curing agent.

In Example 19 polyhexylene adipate polyester polyol (product name: Nippollan 136, by Tosoh Corporation) having a number-average molecular weight of 2600 (hereafter referred to as PHA2600) was used as the polyol for a prepolymer.

Examples 21 to 28

Wiper blades were produced and evaluated in the same way as in Example 1 but herein the types and use amounts of the various materials for the prepolymer and the types and use amounts of the various materials for the curing agent were as given in Table 5.

Example 29

Herein 304.0 g of 4,4'-MDI, 20.0 g of polymeric MDI (product name: Cosmonate M-200, by Mitsui Chemicals, Inc.) (hereafter referred to as M200) and 676.0 g of polytetramethylene ether glycol having a number-average molecular weight of 2000 (product name: PTG-2000SN, by Hodogaya Chemical Co., Ltd.) (hereafter referred to as PTG2000SN) were caused to react at 80° C. for 3 hours, to prepare a prepolymer having an NCO content of 7.9 mass %.

Further, 39.6 g of pentaerythritol, 290.3 g of polytetramethylene ether glycol having a number-average molecular weight of 1000 (product name: PTG-1000SN, by Hodogaya Chemical Co., Ltd.) (hereafter referred to as PTG1000SN), 0.13 g of Polycat 46 and 0.55 g of No. 25 were mixed to produce a curing agent.

A raw material composition was then obtained by mixing the prepolymer and the curing agent having been prepared above. This raw material composition was injected into a molding mold for wiper blades, and was cured at a temperature of 130° C. for 6 minutes. This was followed by demolding, to yield a polyurethane molded product. The obtained polyurethane molded product was processed in the same way as in Example 1, to produce a wiper blade that was then evaluated.

Examples 30 to 32

Wiper blades were produced and evaluated in the same way as in Example 1 but herein the types and use amounts of the various materials for the prepolymer and the types and use amounts of the various materials for the curing agent were as given in Table 5 and Table 6.

Example 33

Herein 349.5 g 4,4'-MDI, and 650.5 g of a polybutylene adipate polyester polyol having a number-average molecular weight of 2000 (product name: Nippollan 4010, by Tosoh Corporation) (hereafter referred to as PBA2000), without addition of the trifunctional or higher polyfunctional isocyanate, were caused to react at 80° C. for 3 hours, to prepare a prepolymer having an NCO content of 9.0 mass %.

A curing agent was produced by mixing 40.4 g of 1,4-BD, 5.0 g of glycerin, 5.0 g of PHA1000, 0.05 g of Polycat 46 and 0.25 g of No. 25. This curing agent was mixed with the previously prepared prepolymer, to yield a raw material composition. This raw material composition was injected into a molding mold for wiper blades and was cured at a temperature of 130° C. for 10 minutes. This was followed by demolding and secondary curing at a temperature of 130° C. for 60 minutes, to yield a polyurethane molded product. The obtained polyurethane molded product was processed in the same way as in Example 1, to produce a wiper blade that was then evaluated.

Example 34

A wiper blade was produced and evaluated in the same way as in Example 1 but herein the types and use amounts of the various materials for the prepolymer and the types and use amounts of the various materials for the curing agent were as given in Table 6. Next, the lip portion of the wiper blade was irradiated with ultraviolet rays so that the accumulated light intensity of ultraviolet rays was 492 mJ/cm$^2$, to yield the wiper blade according to the present example. A low-pressure mercury ozoneless lamp (by Toshiba Lighting & Technology Corporation) having a maximum emission wavelength peak at a wavelength of 254 nm was used as the light source of ultraviolet rays. The wiper blade was evaluated in the same way as in Example 1.

Examples 35 and 36

Wiper blades were produced and evaluated in the same way as in Example 1 but herein the types and use amounts of the various materials for the prepolymer and the types and use amounts of the various materials for the curing agent were as given in Table 6. Wiper blades according to Examples 35 and 36 were then obtained through irradiation of the obtained wiper blade with ultraviolet rays in the same way as in Example 34, but herein the accumulated light intensity was modified to the values given in Table 6. These wiper blades were evaluated in the same way as in Example 1.

Example 37

Herein 296.6 g of 4,4'-MDI and 703.4 g of PBA2000, without addition of the trifunctional or higher polyfunctional isocyanate, were caused to react at 80° C. for 3 hours, to yield a prepolymer having an NCO content of 7.0 mass %.

A curing agent was produced by mixing 52.0 g of 1,4-BD, 19.2 g of glycerin, without addition of PHA1000, 0.05 g of Polycat 46, and 0.25 g of No. 25. This curing agent was mixed with the previously prepared prepolymer, to yield a raw material composition. This raw material composition was injected into a molding mold for wiper blades and was cured at a temperature of 130° C. for 10 minutes. This was followed by demolding and secondary curing at a temperature of 130° C. for 60 minutes, to yield a polyurethane molded product. The obtained polyurethane molded product was processed in the same way as in Example 1, to produce a wiper blade that was then evaluated. This wiper blade was irradiated with ultraviolet rays in the same way as in Example 34, to yield a wiper blade according to the present example. Irradiation with ultraviolet rays was conducted so that the accumulated light intensity was 1968 mJ/cm$^2$. The obtained wiper blade was evaluated in the same way as in Example 1.

Example 38

A wiper blade was produced and evaluated in the same way as in Example 1 but herein the types and use amounts of the various materials for the prepolymer and the types and use amounts of the various materials for the curing agent were as given in Table 6.

Examples 39 and 40

Wiper blades were produced and evaluated in the same way as in Example 1 but herein the types and use amounts of the various materials for the prepolymer and the types and use amounts of the various materials for the curing agent were as given in Table 6. Wiper blades according to Examples 39 and 40 were then obtained through irradiation of the obtained wiper blades with ultraviolet rays in the same way as in Example 34, but herein the accumulated light intensity was modified to the values given in Table 6. These wiper blades were evaluated in the same way as in Example 1.

Example 41

Table 7 illustrates the types and use amounts of the various materials used for the prepolymer. These materials were mixed and caused to react at a temperature of 80° C. for 3 hours, to prepare a prepolymer having an NCO content of 9.0 mass %.

Various materials for curing agents as given in Table 7 were mixed in the amounts given in Table 7, to prepare a curing agent. A raw material composition was then obtained by mixing the prepolymer and the curing agent above. This raw material composition was injected into a molding mold for wiper blades and was cured at a temperature of 130° C. for 10 minutes. This was followed by demolding and secondary curing at a temperature of 130° C. for 60 minutes, to yield a polyurethane molded product. The obtained polyurethane molded product was processed in the same way as in Example 1, to produce a wiper blade according to present example. The obtained wiper blade was evaluated in the same way as in Example 1.

Examples 42 to 44

Prepolymers were prepared in the same way as in Example 41, but herein the types and use amounts of the various materials for the prepolymer were as given in Table 7. The NCO content of the prepolymer of Example 42 was 8.2 mass %, the NCO content of the prepolymer of Example 43 was 15.0 mass %, and the NCO content of the prepolymer of Example 44 was 18.0 mass %.

A curing agent was prepared in the same way as in Example 41, but herein the various materials and use amounts thereof for the curing agent were as given in Table 7. Wiper blades were produced and evaluated in the same manner as in Example 41, but using herein these prepolymers and curing agent.

Examples 45 and 46

The wiper blade obtained in Example 44 was irradiated with ultraviolet rays in the same way as in Example 34, but herein the accumulated light intensity was set to the values given in Table 6, to yield wiper blades according to Examples 45 and 46. The obtained wiper blades were evaluated in the same way as in Example 1.

Examples 47 to 50

Prepolymers were prepared in the same way as in Example 41, but herein the types and use amounts of the various materials for the prepolymer were as given in Table 7. The NCO content of the prepolymer according to Example 47 was 10.0 mass %, the NCO content of the prepolymer according to Example 48 was 9.6 mass %, the NCO content of the prepolymer according to Example 49 was 9.3 mass %, and the NCO content of the prepolymer according to Example 50 was 9.2 mass %.
A curing agent was prepared in the same way as in Example 41, but herein the various materials and use amounts thereof for the curing agent were as given in Table 7. Wiper blades according to Examples 47 to 50 were produced in the same way as in Example 41, but using herein the above prepolymers and curing agent, and the produced wiper blades were evaluated.

Example 51

Herein 2 mm of the tip of a lip portion of the wiper blade produced as in Example 37 was immersed for 1 minute in 4,4'-MDI dissolved at a temperature of 80° C. Thereafter, 4,4'-MDI adhered to the surface of the immersed portion of the wiper blade was wiped off using a sponge soaked with butyl acetate. The wiper blade was then aged for 24 hours in an environment at a temperature of 23° C. and 50% relative humidity, to form a cured region at the tip of the lip portion. A wiper blade according to present example was thus obtained. The wiper blade was evaluated in the same way as in Example 1.

Example 52

A wiper blade according to present example was produced in the same way as in Example 51, but herein with heating for 30 minutes at a temperature of 100° C. after the 4,4'-MDI adhered to the surface of the soaked wiper blade had been wiped off. This wiper blade was evaluated in the same way as in Example 1.

Example 53

A wiper blade according to present example was obtained by subjecting a wiper blade produced in the same way as in Example 4 to the same surface treatment as that of Example 51, but setting herein the immersion time in 4,4'-MDI to 3 minutes. The wiper blade was evaluated in the same way as in Example 1.

Example 54

A wiper blade according to present example was produced in the same way as in Example 53, but herein with heating for 30 minutes at a temperature of 100° C. after the 4,4'-MDI adhered to the surface of the soaked wiper blade had been wiped off. This wiper blade was evaluated in the same way as in Example 1.

Comparative Example 1

Table 9 sets out the types and use amounts of the various materials used for the prepolymer. These materials were mixed and caused to react at a temperature of 80° C. for 3 hours, to prepare a prepolymer having an NCO content of 14.0 mass %. Various materials for curing agents as given in Table 9 were mixed in the amounts given in Table 9, to prepare a curing agent. A raw material composition was then obtained by mixing the prepolymer and the curing agent above. This raw material composition was injected into a molding mold for wiper blades and was cured at a temperature of 130° C. for 10 minutes. This was followed by demolding and secondary curing at a temperature of 130° C. for 60 minutes, to yield a polyurethane molded product. The obtained polyurethane molded product was processed in the same way as in Example 1, to produce a wiper blade according to present example. The obtained wiper blade was evaluated in the same way as in Example 1.

Comparative Example 2

A prepolymer having an NCO content of 9.0 mass % was prepared in the same way as in Comparative example 1, but herein the types and use amounts of the various materials for the prepolymer were as given in Table 9. A curing agent was prepared in the same way as in Comparative example 1, but herein the various materials and use amounts thereof for the curing agent were as given in Table 9. A wiper blade according to the present comparative example was produced and evaluated in the same way as in Comparative example 1, but using herein the above prepolymer and curing agent.

Comparative Example 3

A prepolymer having an NCO content of 7.0 mass % was prepared in the same way as in Comparative example 1, but herein the types and use amounts of the various materials for the prepolymer were as given in Table 9. A curing agent was prepared in the same way as in Comparative example 1, but herein the various materials and use amounts thereof for the curing agent were as given in Table 9. A wiper blade was produced in the same manner as in Comparative example 1, but using herein the above prepolymer and curing agent. A wiper blade according to the present comparative example was obtained by irradiating the obtained wiper blade in the same way as in Example 34, but herein the accumulated light intensity was set to 8200 mJ/cm$^2$. The obtained wiper blade was evaluated in the same way as in Example 1.

Comparative Example 4

To 100 parts by mass of natural rubber there were added 48.0 parts by mass of carbon black (product name: Toka Black #7360SB, by Tokai Carbon Co., Ltd.), 5.0 parts by mass of zinc oxide (product name: Zinc White 2, by Sakai Chemical Industry Co., Ltd.), 1.0 part by mass of zinc stearate (product name: SZ-2000, by Sakai Chemical Industry Co., Ltd.), and 20 parts by mass of calcium carbonate (product name: Nanox #30, by Maruo Calcium Co., Ltd.), and the whole was kneaded for 15 minutes in a sealed mixer adjusted to 50° C. To the resulting mixture there were further added 1.2 parts by mass of sulfur and 4.5 parts by mass of tetrabenzylthiuram sulfide (TBzTD) (product name: Perkacit TBzTD, by FlexSys, Inc.), as vulcanizing agents.

The resulting product was kneaded for 10 minutes using a two-roll machine cooled down to a temperature of 25° C., to yield a rubber composition. The obtained rubber composition was placed in a molding mold for wiper blades and was vulcanized by being heated at a temperature of 170° C. for 20 minutes. This was followed by demolding, to thereby yield the wiper blade according to the present comparative example. The obtained wiper blade was evaluated in the same way as in Example 1.

Tables 3 to 9 set out the evaluation results of the wiper blades according to the respective examples and comparative examples.

TABLE 3

| | | | | Example 1 | Example 2 | Example 3 | Example 4 | Example 5 |
|---|---|---|---|---|---|---|---|---|
| Formulation | Prepolymer | MDI amount (g) | | 352.6 | 357.2 | 358.2 | 343.3 | 334.6 |
| | | Trifunctional or higher polyfunctional isocyanate | Type | TTI | TTI | TPTI | TTI | MR400 |
| | | | Amount (g) | 10.0 | 5.0 | 5.0 | 20.0 | 40.0 |
| | | Polyol | Type | PBA2500 | PBA2500 | PBA2500 | PBA2500 | PBA2500 |
| | | | Amount (g) | 637.4 | 637.8 | 636.8 | 636.7 | 625.4 |
| | Curing agent | Trifunctional or higher polyfunctional alcohol | Type | Pentaerythritol | Pentaerythritol | Pentaerythritol | Pentaerythritol | Pentaerythritol |
| | | | Amount (g) | 26.6 | 24.3 | 24.3 | 46.7 | 28.1 |
| | | 1,4-BD amount (g) | | 7.0 | 9.6 | 9.6 | 7.8 | 11.1 |
| | | Polyol | Type | PHA1000 | PHA1000 | PHA1000 | PHA1000 | PHA1000 |
| | | | Amount (g) | 246.3 | 248.9 | 248.8 | 334.5 | 287.7 |
| | | Polycat 46 amount (g) | | 0.13 | 0.13 | 0.13 | 0.13 | 0.13 |
| | | No. 25 amount (g) | | 0.55 | 0.55 | 0.55 | 0.55 | 0.55 |
| | | Post-treatment | | No | No | No | No | No |
| Elastic modulus | First tapered surface | Mean value (MPa) | | 20 | 15 | 16 | 15 | 20 |
| | | Standard deviation (MPa) | | 1.000 | 0.945 | 0.896 | 0.740 | 0.780 |
| | | Coefficient of variation | | 5.0 | 6.3 | 5.6 | 4.9 | 3.9 |
| | Second tapered surface | Mean value (MPa) | | 21 | 15 | 17 | 16 | 19 |
| | | Standard deviation (MPa) | | 1.100 | 0.960 | 0.896 | 0.730 | 0.780 |
| | | Coefficient of variation | | 5.2 | 6.4 | 5.3 | 4.6 | 4.1 |
| Concentration of trifunctional or higher polyfunctional alcohol (mmol/g) | | First tapered surface | | 0.15 | 0.14 | 0.14 | 0.24 | 0.16 |
| | | Second tapered surface | | 0.15 | 0.14 | 0.14 | 0.25 | 0.16 |
| M2/M1 | | First tapered surface | | 0.0011 | 0.0007 | 0.0008 | 0.0010 | 0.0016 |
| | | Second tapered surface | | 0.0010 | 0.0008 | 0.0008 | 0.0011 | 0.0015 |
| M3/M1 | | First tapered surface | | 0.0964 | 0.0974 | 0.0977 | 0.0865 | 0.0882 |
| | | Second tapered surface | | 0.0966 | 0.0973 | 0.0977 | 0.0864 | 0.0883 |
| Evaluation rank of wiping performance | | Initial | | B | B | B | B | B |
| | | After 100,000 wipes | | B | C | B | B | B |
| | | After 500,000 wipes | | C | C | C | C | C |

| | | | | Example 6 | Example 7 | Example 8 | Example 9 | Example 10 |
|---|---|---|---|---|---|---|---|---|
| Formulation | Prepolymer | MDI amount (g) | | 301.9 | 301.9 | 269.2 | 281.0 | 281.0 |
| | | Trifunctional or higher polyfunctional isocyanate | Type | MR400 | MR400 | MR400 | TPTI | TPTI |
| | | | Amount (g) | 80.0 | 80.0 | 120.0 | 120.0 | 120.0 |
| | | Polyol | Type | PBA2500 | PBA2500 | PBA2500 | PBA2500 | PBA2500 |
| | | | Amount (g) | 618.1 | 618.1 | 610.8 | 599.0 | 599.0 |
| | Curing agent | Trifunctional or higher polyfunctional alcohol | Type | Glycerin | Glycerin | Glycerin | Glycerin | Glycerin |
| | | | Amount (g) | 29.0 | 26.7 | 27.3 | 44.6 | 27.5 |
| | | 1,4-BD amount (g) | | 11.5 | 10.6 | 13.6 | 4.1 | 10.9 |
| | | Polyol | Type | PHA1000 | PHA1000 | PHA1000 | PHA1000 | PHA1000 |
| | | | Amount (g) | 297.2 | 273.1 | 300.3 | 356.7 | 281.1 |
| | | Polycat 46 amount (g) | | 0.13 | 0.13 | 0.13 | 0.13 | 0.13 |
| | | No. 25 amount (g) | | 0.55 | 0.55 | 0.55 | 0.55 | 0.55 |
| | | Post-treatment | | No | No | No | No | No |
| Elastic modulus | First tapered surface | Mean value (MPa) | | 26 | 29 | 32 | 32 | 34 |
| | | Standard deviation (MPa) | | 0.800 | 0.900 | 0.940 | 1.120 | 1.010 |
| | | Coefficient of variation | | 3.1 | 3.1 | 2.9 | 3.5 | 3.0 |
| | Second tapered surface | Mean value (MPa) | | 25 | 30 | 33 | 32 | 35 |
| | | Standard deviation (MPa) | | 0.810 | 0.920 | 0.950 | 1.110 | 1.030 |
| | | Coefficient of variation | | 3.2 | 3.1 | 2.9 | 3.5 | 2.9 |
| Concentration of trifunctional or higher polyfunctional alcohol (mmol/g) | | First tapered surface | | 0.24 | 0.22 | 0.22 | 0.33 | 0.23 |
| | | Second tapered surface | | 0.23 | 0.22 | 0.22 | 0.34 | 0.23 |
| M2/M1 | | First tapered surface | | 0.0029 | 0.0029 | 0.0041 | 0.0040 | 0.0042 |
| | | Second tapered surface | | 0.0029 | 0.0029 | 0.0041 | 0.0041 | 0.0042 |
| M3/M1 | | First tapered surface | | 0.0789 | 0.0806 | 0.0702 | 0.0699 | 0.0745 |
| | | Second tapered surface | | 0.0788 | 0.0806 | 0.0702 | 0.0698 | 0.0745 |
| Evaluation rank of wiping performance | | Initial | | B | B | A | A | A |
| | | After 100,000 wipes | | B | B | A | B | A |
| | | After 500,000 wipes | | C | C | B | B | B |

TABLE 4

| | | | | Example 11 | Example 12 | Example 13 | Example 14 | Example 15 |
|---|---|---|---|---|---|---|---|---|
| Formulation | Prepolymer | MDI amount (g) | | 269.2 | 281.0 | 281.0 | 241.4 | 201.0 |
| | | Trifunctional or higher polyfunctional isocyanate | Type | MR400 | TPTI | TPTI | MR200 | TTI |
| | | | Amount (g) | 120.0 | 120.0 | 120.0 | 150.0 | 180.0 |
| | | Polyol | Type | PBA2500 | PBA2500 | PBA2500 | PBA2500 | PBA2500 |
| | | | Amount (g) | 610.8 | 599.0 | 599.0 | 608.6 | 619.0 |
| | Curing agent | Trifunctional or higher polyfunctional alcohol | Type | Glycerin | Pentaerythritol | TMP | TMP | TMP |
| | | | Amount (g) | 34.9 | 28.1 | 48.9 | 48.9 | 48.9 |
| | | 1,4-BD amount (g) | | 0.0 | 11.1 | 0.0 | 0.0 | 0.0 |
| | | Polyol | Type | PHA1000 | PHA1000 | PHA1000 | PHA1000 | PHA1000 |
| | | | Amount (g) | 256.0 | 287.6 | 276.8 | 276.8 | 276.8 |
| | | Polycat 46 amount (g) | | 0.13 | 0.13 | 0.13 | 0.13 | 0.13 |
| | | No. 25 amount (g) | | 0.55 | 0.55 | 0.55 | 0.55 | 0.55 |
| | Post-treatment | | | No | No | No | No | No |
| Elastic modulus | First tapered surface | Mean value (MPa) | | 43 | 32 | 41 | 42 | 51 |
| | | Standard deviation (MPa) | | 1.290 | 1.440 | 1.140 | 1.190 | 1.510 |
| | | Coefficient of variation | | 3.0 | 4.5 | 2.8 | 2.8 | 3.0 |
| | Second tapered surface | Mean value (MPa) | | 42 | 33 | 42 | 42 | 50 |
| | | Standard deviation (MPa) | | 1.270 | 1.460 | 1.150 | 1.180 | 1.490 |
| | | Coefficient of variation | | 3.0 | 4.4 | 2.7 | 2.8 | 3.0 |
| Concentration of trifunctional or higher polyfunctional alcohol (mmol/g) | | First tapered surface | | 0.29 | 0.17 | 0.27 | 0.27 | 0.27 |
| | | Second tapered surface | | 0.28 | 0.16 | 0.28 | 0.27 | 0.26 |
| M2/M1 | | First tapered surface | | 0.0042 | 0.0041 | 0.0041 | 0.0052 | 0.0081 |
| | | Second tapered surface | | 0.0042 | 0.0040 | 0.0041 | 0.0053 | 0.0083 |
| M3/M1 | | First tapered surface | | 0.0729 | 0.0741 | 0.0741 | 0.0637 | 0.0530 |
| | | Second tapered surface | | 0.0728 | 0.0742 | 0.0741 | 0.0636 | 0.0527 |
| Evaluation rank of wiping performance | | Initial | | A | A | A | A | A |
| | | After 100,000 wipes | | A | B | A | A | A |
| | | After 500,000 wipes | | B | B | A | A | B |

| | | | | Example 16 | Example 17 | Example 18 | Example 19 | Example 20 |
|---|---|---|---|---|---|---|---|---|
| Formulation | Prepolymer | MDI amount (g) | | 201.0 | 201.0 | 352.6 | 198.2 | 198.2 |
| | | Trifunctional or higher polyfunctional isocyanate | Type | TTI | TTI | TTI | TTI | TTI |
| | | | Amount (g) | 180.0 | 180.0 | 10.0 | 180.0 | 180.0 |
| | | Polyol | Type | PBA2500 | PBA2500 | PBA2500 | PHA2600 | PHA2600 |
| | | | Amount (g) | 619.0 | 619.0 | 637.4 | 621.8 | 621.8 |
| | Curing agent | Trifunctional or higher polyfunctional alcohol | Type | TMP | TMP | Pentaerythritol | TMP | TMP |
| | | | Amount (g) | 56.0 | 59.6 | 26.6 | 59.6 | 59.6 |
| | | 1,4-BD amount (g) | | 0.0 | 0.0 | 7.0 | 0.0 | 0.0 |
| | | Polyol | Type | PHA1000 | PHA1000 | PBA1000 | PHA1000 | PBA1000 |
| | | | Amount (g) | 317.5 | 337.9 | 246.3 | 337.9 | 337.9 |
| | | Polycat 46 amount (g) | | 0.13 | 0.13 | 0.13 | 0.13 | 0.13 |
| | | No. 25 amount (g) | | 0.55 | 0.55 | 0.55 | 0.55 | 0.55 |
| | Post-treatment | | | No | No | No | No | No |
| Elastic modulus | First tapered surface | Mean value (MPa) | | 47 | 44 | 17 | 46 | 43 |
| | | Standard deviation (MPa) | | 1.370 | 1.260 | 1.071 | 1.748 | 1.250 |
| | | Coefficient of variation | | 2.9 | 2.9 | 6.3 | 3.8 | 2.9 |
| | Second tapered surface | Mean value (MPa) | | 46 | 44 | 18 | 48 | 43 |
| | | Standard deviation (MPa) | | 1.360 | 1.250 | 1.090 | 1.760 | 1.250 |
| | | Coefficient of variation | | 3.0 | 2.8 | 6.1 | 3.7 | 2.9 |
| Concentration of trifunctional or higher polyfunctional alcohol (mmol/g) | | First tapered surface | | 0.30 | 0.32 | 0.15 | 0.32 | 0.31 |
| | | Second tapered surface | | 0.30 | 0.31 | 0.14 | 0.33 | 0.32 |
| M2/M1 | | First tapered surface | | 0.0082 | 0.0081 | 0.0011 | 0.0081 | 0.0082 |
| | | Second tapered surface | | 0.0080 | 0.0081 | 0.0011 | 0.0082 | 0.0081 |
| M3/M1 | | First tapered surface | | 0.0511 | 0.0503 | 0.0964 | 0.0496 | 0.0496 |
| | | Second tapered surface | | 0.0513 | 0.0503 | 0.0964 | 0.0496 | 0.0497 |
| Evaluation rank of wiping performance | | Initial | | A | A | B | A | A |
| | | After 100,000 wipes | | A | A | C | A | A |
| | | After 500,000 wipes | | B | B | C | B | B |

TABLE 5

| | | | Example 21 | Example 22 | Example 23 | Example 24 | Example 25 |
|---|---|---|---|---|---|---|---|
| Formulation | Prepolymer | MDI amount (g) | 217.2 | 191.1 | 209.1 | 187.6 | 164.0 |
| | | Trifunctional or higher polyfunctional isocyanate Type | TTI | MR200 | TPTI | TPTI | TTI |
| | | Amount (g) | 180.0 | 210.0 | 220.0 | 250.0 | 220.0 |
| | | Polyol Type | PBA2500 | PBA2500 | PBA2500 | PBA2500 | PBA2500 |
| | | Amount (g) | 602.8 | 598.9 | 570.9 | 562.4 | 616.0 |
| | Curing agent | Trifunctional or higher polyfunctional alcohol Type | TMP | TMP | TMP | Glycerin | Glycerin |
| | | Amount (g) | 63.1 | 53.9 | 59.6 | 45.8 | 37.5 |
| | | 1,4-BD amount (g) | 0.0 | 0.0 | 0.0 | 0.0 | 0.0 |
| | | Polyol Type | PHA1000 | PHA1000 | PHA1000 | PHA1000 | PHA1000 |
| | | Amount (g) | 357.8 | 305.3 | 337.9 | 259.3 | 212.6 |
| | | Polycat 46 amount (g) | 0.13 | 0.13 | 0.13 | 0.13 | 0.13 |
| | | No. 25 amount (g) | 0.55 | 0.55 | 0.55 | 0.55 | 0.55 |
| | Post-treatment | | No | No | No | No | No |
| Elastic modulus | First tapered surface | Mean value (MPa) | 47 | 49 | 51 | 55 | 58 |
| | | Standard deviation (MPa) | 1.410 | 1.280 | 1.420 | 1.980 | 1.800 |
| | | Coefficient of variation | 3.0 | 2.6 | 2.8 | 3.6 | 3.1 |
| | Second tapered surface | Mean value (MPa) | 49 | 47 | 53 | 54 | 59 |
| | | Standard deviation (MPa) | 1.410 | 1.270 | 1.440 | 1.960 | 1.830 |
| | | Coefficient of variation | 2.9 | 2.7 | 2.7 | 3.6 | 3.1 |
| Concentration of trifunctional or higher polyfunctional alcohol (mmol/g) | | First tapered surface | 0.33 | 0.30 | 0.32 | 0.37 | 0.32 |
| | | Second tapered surface | 0.32 | 0.30 | 0.32 | 0.38 | 0.33 |
| M2/M1 | | First tapered surface | 0.0079 | 0.0106 | 0.0112 | 0.0142 | 0.0123 |
| | | Second tapered surface | 0.0080 | 0.0105 | 0.0114 | 0.0141 | 0.0124 |
| M3/M1 | | First tapered surface | 0.0534 | 0.0491 | 0.0523 | 0.0502 | 0.0459 |
| | | Second tapered surface | 0.0533 | 0.0492 | 0.0523 | 0.0504 | 0.0457 |
| Evaluation rank of wiping performance | | Initial | A | A | A | A | B |
| | | After 100,000 wipes | A | A | A | A | B |
| | | After 500,000 wipes | B | A | A | B | B |

| | | | Example 26 | Example 27 | Example 28 | Example 29 | Example 30 |
|---|---|---|---|---|---|---|---|
| Formulation | Prepolymer | MDI amount (g) | 187.5 | 191.1 | 216.3 | 304.0 | 148.2 |
| | | Trifunctional or higher polyfunctional isocyanate Type | MR400 | MR200 | TPTI | M200 | M200 |
| | | Amount (g) | 220.0 | 210.0 | 210.0 | 20.0 | 210.0 |
| | | Polyol Type | PBA2500 | PBA2500 | PBA2500 | PTG 2000SN | PTG 2000SN |
| | | Amount (g) | 592.5 | 598.9 | 573.7 | 676.0 | 641.8 |
| | Curing agent | Trifunctional or higher polyfunctional alcohol Type | Glycerin | TMP | TMP | Pentaerythritol | TMP |
| | | Amount (g) | 43.0 | 53.9 | 53.9 | 39.6 | 37.8 |
| | | 1,4-BD amount (g) | 0.0 | 0.0 | 0.0 | 0.0 | 0.0 |
| | | Polyol Type | PHA1000 | PHA1000 | PHA1000 | PTG 1000SN | PTG 1000SN |
| | | Amount (g) | 243.7 | 305.3 | 305.3 | 290.3 | 214.4 |
| | | Polycat 46 amount (g) | 0.13 | 0.15 | 0.17 | 0.13 | 0.13 |
| | | No. 25 amount (g) | 0.55 | 0.55 | 0.55 | 0.55 | 0.55 |
| | Post-treatment | | No | No | No | No | No |
| Elastic modulus | First tapered surface | Mean value (MPa) | 61 | 50 | 52 | 16 | 39 |
| | | Standard deviation (MPa) | 2.020 | 1.230 | 1.110 | 0.711 | 1.140 |
| | | Coefficient of variation | 3.3 | 2.5 | 2.1 | 4.4 | 2.9 |
| | Second tapered surface | Mean value (MPa) | 62 | 51 | 52 | 16 | 41 |
| | | Standard deviation (MPa) | 2.050 | 1.240 | 1.100 | 0.700 | 1.160 |
| | | Coefficient of variation | 3.3 | 2.4 | 2.1 | 4.4 | 2.8 |
| Concentration of trifunctional or higher polyfunctional alcohol (mmol/g) | | First tapered surface | 0.37 | 0.30 | 0.30 | 0.21 | 0.23 |
| | | Second tapered surface | 0.36 | 0.30 | 0.31 | 0.22 | 0.24 |
| M2/M1 | | First tapered surface | 0.0122 | 0.0087 | 0.0088 | 0.0049 | 0.0147 |
| | | Second tapered surface | 0.0124 | 0.0089 | 0.0088 | 0.0048 | 0.0147 |
| M3/M1 | | First tapered surface | 0.0509 | 0.0491 | 0.0556 | 0.0805 | 0.0413 |
| | | Second tapered surface | 0.0507 | 0.0490 | 0.0556 | 0.0805 | 0.0413 |
| Evaluation rank of wiping performance | | Initial | A | A | A | B | A |
| | | After 100,000 wipes | B | A | A | B | A |
| | | After 500,000 wipes | B | A | A | C | A |

TABLE 6

| | | | Example 31 | Example 32 | Example 33 | Example 34 | Example 35 |
|---|---|---|---|---|---|---|---|
| Formulation | Prepolymer | MDI amount (g) | 148.2 | 148.2 | 349.5 | 345.5 | 281.0 |
| | | Trifunctional or higher polyfunctional isocyanate Type | M200 | M200 | — | MR400 | TPTI |
| | | Amount (g) | 210.0 | 210.0 | — | 20.0 | 120.0 |
| | | Polyol Type | PTG 2000SN | PTG 2000SN | PBA2000 | PBA2500 | PBA2500 |
| | | Amount (g) | 641.8 | 641.8 | 650.5 | 634.5 | 599.0 |
| | Curing agent | Trifunctional or higher polyfunctional alcohol Type | TMP | TMP | Glycerin | Pentaerythritol | Pentaerythritol |
| | | Amount (g) | 46.2 | 41.7 | 5.0 | 46.7 | 28.8 |
| | | 1,4-BD amount (g) | 0.0 | 0.0 | 40.4 | 7.8 | 14.4 |
| | | Polyol Type | PTG 1000SN | PTG 1000SN | PHA1000 | PHA1000 | PHA1000 |
| | | Amount (g) | 261.7 | 236.5 | 5.0 | 334.3 | 316.3 |
| | | Polycat 46 amount (g) | 0.13 | 0.13 | 0.05 | 0.13 | 0.13 |
| | | No. 25 amount (g) | 0.55 | 0.55 | 0.25 | 0.55 | 0.55 |
| | | Post-treatment | No | No | No | UV 492 mJ/cm² | UV 1968 mJ/cm² |
| Elastic modulus | First tapered surface | Mean value (MPa) | 42 | 47 | 28 | 68 | 241 |
| | | Standard deviation (MPa) | 1.260 | 1.280 | 2.700 | 3.200 | 9.400 |
| | | Coefficient of variation | 3.0 | 2.7 | 9.6 | 4.7 | 3.9 |
| | Second tapered surface | Mean value (MPa) | 45 | 49 | 28 | 67 | 244 |
| | | Standard deviation (MPa) | 1.300 | 1.290 | 2.690 | 3.100 | 9.500 |
| | | Coefficient of variation | 2.9 | 2.6 | 9.6 | 4.6 | 3.9 |
| Concentration of trifunctional or higher polyfunctional alcohol (mmol/g) | | First tapered surface | 0.26 | 0.24 | 0.05 | 0.25 | 0.17 |
| | | Second tapered surface | 0.26 | 0.25 | 0.05 | 0.24 | 0.16 |
| M2/M1 | | First tapered surface | 0.0132 | 0.0131 | — | 0.0012 | 0.0041 |
| | | Second tapered surface | 0.0133 | 0.0132 | — | 0.0011 | 0.0041 |
| M3/M1 | | First tapered surface | 0.0396 | 0.0405 | 0.1165 | 0.0870 | 0.0723 |
| | | Second tapered surface | 0.0395 | 0.0404 | 0.1165 | 0.0871 | 0.0723 |
| Evaluation rank of wiping performance | | Initial | A | A | C | B | B |
| | | After 100,000 wipes | A | A | C | B | B |
| | | After 500,000 wipes | A | A | C | C | C |

| | | | Example 36 | Example 37 | Example 38 | Example 39 | Example 40 |
|---|---|---|---|---|---|---|---|
| Formulation | Prepolymer | MDI amount (g) | 164.0 | 296.6 | 334.1 | 281.0 | 164.0 |
| | | Trifunctional or higher polyfunctional isocyanate Type | TTI | — | TTI | TPTI | TTI |
| | | Amount (g) | 220.0 | — | 30.0 | 120.0 | 220.0 |
| | | Polyol Type | PBA2500 | PBA2000 | PBA2500 | PBA2500 | PBA2500 |
| | | Amount (g) | 616.0 | 703.4 | 635.9 | 599.0 | 616.0 |
| | Curing agent | Trifunctional or higher polyfunctional alcohol Type | Pentaerythritol | Glycerin | Pentaerythritol | Pentaerythritol | Glycerin |
| | | Amount (g) | 50.6 | 19.2 | 47.7 | 46.0 | 33.1 |
| | | 1,4-BD amount (g) | 0.0 | 52.0 | 7.9 | 4.2 | 0.0 |
| | | Polyol Type | PHA1000 | — | PHA1000 | PHA1000 | PHA1000 |
| | | Amount (g) | 202.5 | 0.0 | 341.7 | 367.6 | 187.6 |
| | | Polycat 46 amount (g) | 0.13 | 0.05 | 0.13 | 0.13 | 0.13 |
| | | No. 25 amount (g) | 0.55 | 0.25 | 0.55 | 0.55 | 0.55 |
| | | Post-treatment | UV 3936 mJ/cm² | UV 1968 mJ/cm² | — | UV 1968 mJ/cm² | UV 3936 mJ/cm² |
| Elastic modulus | First tapered surface | Mean value (MPa) | 470 | 212 | 15 | 253 | 470 |
| | | Standard deviation (MPa) | 22.200 | 13.200 | 0.500 | 5.060 | 9.400 |
| | | Coefficient of variation | 4.7 | 6.2 | 3.3 | 2.0 | 2.0 |
| | Second tapered surface | Mean value (MPa) | 468 | 214 | 16 | 255 | 469 |
| | | Standard deviation (MPa) | 22.000 | 13.200 | 0.520 | 5.200 | 9.300 |
| | | Coefficient of variation | 4.7 | 6.2 | 3.3 | 2.0 | 2.0 |
| Concentration of trifunctional or higher polyfunctional alcohol (mmol/g) | | First tapered surface | 0.31 | 0.18 | 0.25 | 0.22 | 0.28 |
| | | Second tapered surface | 0.30 | 0.19 | 0.24 | 0.23 | 0.27 |
| M2/M1 | | First tapered surface | 0.0121 | — | 0.0016 | 0.0040 | 0.0122 |
| | | Second tapered surface | 0.0122 | — | 0.0017 | 0.0041 | 0.0124 |
| M3/M1 | | First tapered surface | 0.0457 | 0.0969 | 0.0836 | 0.0693 | 0.0470 |
| | | Second tapered surface | 0.0456 | 0.0969 | 0.0836 | 0.0692 | 0.0470 |

TABLE 6-continued

| Evaluation rank of wiping performance | Initial | B | C | B | B | B |
|---|---|---|---|---|---|---|
| | After 100,000 wipes | B | C | C | C | C |
| | After 500,000 wipes | C | C | C | C | C |

TABLE 7

| | | | | Example 41 | Example 42 | Example 43 | Example 44 | Example 45 |
|---|---|---|---|---|---|---|---|---|
| Formulation | Prepolymer | MDI amount (g) | | 372.8 | 327.0 | 526.0 | 602.6 | 602.6 |
| | | Trifunctional or higher polyfunctional isocyanate | Type | — | — | — | — | — |
| | | | Amount (g) | — | — | — | — | — |
| | | Polyol | Type | PBA1000 PBA2000 | PBA2000 | PBA1000 PBA2000 | PBA1000 PBA2000 | PBA1000 PBA2000 |
| | | | Amount (g) | 627.2 | 673.0 | 474.0 | 397.4 | 397.4 |
| | Curing agent | Trifunctional or higher polyfunctional alcohol | Type | Pentaerythritol | TMP | — | — | — |
| | | | Amount (g) | 5.1 | 16.7 | — | — | — |
| | | 1,4-BD amount (g) | | 41.0 | 16.7 | 91.3 | 88.4 | 88.4 |
| | | Polyol | Type | PHA1000 | PHA1000 | PHA1000 | PHA1000 | PHA1000 |
| | | | Amount (g) | 5.1 | 204.9 | 91.3 | 88.4 | 88.4 |
| | | Polycat 46 amount (g) | | 0.05 | 0.05 | 0.15 | 0.15 | 0.15 |
| | | No. 25 amount (q) | | 0.25 | 0.25 | 0.55 | 0.55 | 0.55 |
| | Post-treatment | | | No | No | No | No | UV 492 mJ/cm$^2$ |
| Elastic modulus | First tapered surface | Mean value (MPa) | | 25 | 16 | 15 | 30 | 84 |
| | | Standard deviation (MPa) | | 2.800 | 1.500 | 2.640 | 5.040 | 10.300 |
| | | Coefficient of variation | | 11.2 | 9.4 | 17.6 | 16.8 | 12.3 |
| | Second tapered surface | Mean value (MPa) | | 23 | 18 | 15 | 32 | 86 |
| | | Standard deviation (MPa) | | 2.700 | 1.700 | 2.500 | 5.100 | 10.300 |
| | | Coefficient of variation | | 11.7 | 9.4 | 16.7 | 15.9 | 12.0 |
| Concentration of trifunctional or higher polyfunctional alcohol (mmol/g) | First tapered surface | | | 0.04 | 0.10 | — | — | — |
| | Second tapered surface | | | 0.04 | 0.11 | — | — | — |
| M2/M1 | First tapered surface | | | — | — | — | — | — |
| | Second tapered surface | | | — | — | — | — | — |
| M3/M1 | First tapered surface | | | 0.1241 | 0.0924 | 0.1556 | 0.1792 | 0.1794 |
| | Second tapered surface | | | 0.1241 | 0.0924 | 0.1557 | 0.1792 | 0.1793 |
| Evaluation rank of wiping performance | Initial | | | C | C | C | C | C |
| | After 100,000 wipes | | | C | C | D | D | C |
| | After 500,000 wipes | | | C | C | D | D | D |

| | | | | Example 46 | Example 47 | Example 48 | Example 49 | Example 50 |
|---|---|---|---|---|---|---|---|---|
| Formulation | Prepolymer | MDI amount (g) | | 602.6 | 348.9 | 330.9 | 236.6 | 154.7 |
| | | Trifunctional or higher polyfunctional isocyanate | Type | | TTI | TPTI | MR400 | MR400 |
| | | | Amount (g) | — | 30 | 50 | 150 | 250 |
| | | Polyol | Type | PBA1000 PBA2000 | PBA2000 | PBA2000 | PBA2000 | PBA2000 |
| | | | Amount (g) | 397.4 | 621.1 | 619.1 | 613.4 | 595.3 |
| | Curing agent | Trifunctional or higher polyfunctional alcohol | Type | — | — | — | — | — |
| | | | Amount (g) | — | — | — | — | — |
| | | 1,4-BD amount (g) | | 88.4 | 18.3 | 14.4 | 15.7 | 14.4 |
| | | Polyol | Type | PHA1000 | PHA1000 | PHA1000 | PHA1000 | PHA1000 |
| | | | Amount (g) | 88.4 | 73.3 | 57.6 | 62.8 | 57.6 |
| | | Polycat 46 amount (g) | | 0.15 | 0.13 | 0.13 | 0.13 | 0.13 |
| | | No. 25 amount (q) | | 0.55 | 0.55 | 0.55 | 0.55 | 0.55 |
| | Post-treatment | | | UV 2952 mJ/cm$^2$ | No | No | No | No |
| Elastic modulus | First tapered surface | Mean value (MPa) | | 338 | 21 | 33 | 42 | 53 |
| | | Standard deviation (MPa) | | 43.400 | 1.932 | 2.772 | 2.982 | 3.392 |
| | | Coefficient of variation | | 12.8 | 9.2 | 8.4 | 7.1 | 6.4 |
| | Second tapered surface | Mean value (MPa) | | 341 | 23 | 35 | 41 | 55 |
| | | Standard deviation (MPa) | | 43.400 | 1.930 | 2.900 | 2.982 | 3.500 |
| | | Coefficient of variation | | 12.7 | 8.4 | 8.3 | 7.3 | 6.4 |

TABLE 7-continued

| Concentration of trifunctional or higher polyfunctional alcohol (mmol/g) | First tapered surface | — | — | — | — | — |
|---|---|---|---|---|---|---|
| | Second tapered surface | — | — | — | — | — |
| M2/M1 | First tapered surface | — | 0.0016 | 0.0024 | 0.0060 | 0.0095 |
| | Second tapered surface | — | 0.0015 | 0.0023 | 0.0059 | 0.0094 |
| M3/M1 | First tapered surface | 0.1792 | 0.1118 | 0.1075 | 0.0767 | 0.0504 |
| | Second tapered surface | 0.1791 | 0.1119 | 0.1079 | 0.0768 | 0.0505 |
| Evaluation rank of wiping performance | Initial | C | B | B | B | B |
| | After 100,000 wipes | C | C | B | B | B |
| | After 500,000 wipes | D | C | C | C | C |

TABLE 8

| | | | | Example 51 | Example 52 | Example 53 | Example 54 |
|---|---|---|---|---|---|---|---|
| Formulation | Prepolymer | MDI amount (g) | | 296.6 | 296.6 | 343.3 | 343.3 |
| | | Trifunctional or higher polyfunctional isocyanate | Type | — | — | TTI | TTI |
| | | | Amount (g) | — | — | 20.0 | 20.0 |
| | | Polyol | Type | PBA2000 | PBA2000 | PBA2500 | PBA2500 |
| | | | Amount (g) | 703.4 | 703.4 | 636.7 | 636.7 |
| | Curing agent | Trifunctional or higher polyfunctional alcohol | Type | Glycerin | Glycerin | Pentaerythritol | Pentaerythritol |
| | | | Amount (g) | 19.2 | 19.2 | 46.7 | 46.7 |
| | | 1,4-BD amount (g) | | 52.0 | 52.0 | 7.8 | 7.8 |
| | | Polyol | Type | — | — | PHA1000 | PHA1000 |
| | | | Amount (g) | 0.0 | 0.0 | 334.3 | 334.3 |
| | | Polycat 46 amount (g) | | 0.05 | 0.05 | 0.13 | 0.13 |
| | | No. 25 amount (g) | | 0.25 | 0.25 | 0.55 | 0.55 |
| | | Post-treatment | | 4,4'-MDI immersion 80° C. 1 min | 4,4'-MDI immersion 80° C. 1 min → 100° C. 30 min | 4,4'-MDI immersion 80° C. 3 min | 4,4'-MDI immersion 80° C. 3 min → 100° C. 30 min |
| Elastic modulus | First tapered surface | Mean value (MPa) | | 438 | 45 | 470 | 53 |
| | | Standard deviation (MPa) | | 29.600 | 4.200 | 20.500 | 3.100 |
| | | Coefficient of variation | | 6.8 | 9.3 | 4.4 | 5.8 |
| | Second tapered surface | Mean value (MPa) | | 438 | 47 | 470 | 54 |
| | | Standard deviation (MPa) | | 29.600 | 4.300 | 21.000 | 3.200 |
| | | Coefficient of variation | | 6.8 | 9.1 | 4.5 | 5.9 |
| Concentration of trifunctional or higher polyfunctional alcohol (mmol/g) | First tapered surface | | | 0.13 | 0.15 | 0.21 | 0.24 |
| | Second tapered surface | | | 0.14 | 0.15 | 0.20 | 0.23 |
| M2/M1 | First tapered surface | | | — | — | 0.0005 | 0.0010 |
| | Second tapered surface | | | — | — | 0.0006 | 0.0011 |
| M3/M1 | First tapered surface | | | 0.3822 | 0.1923 | 0.4320 | 0.2830 |
| | Second tapered surface | | | 0.3793 | 0.1855 | 0.4380 | 0.2850 |
| Evaluation rank of wiping performance | Initial | | | C | B | B | B |
| | After 100,000 wipes | | | C | C | B | B |
| | After 500,000 wipes | | | C | C | C | C |

TABLE 9

| | | | | Comparative example 1 | Comparative example 2 | Comparative example 3 | Comparative example 4 |
|---|---|---|---|---|---|---|---|
| Formulation | Prepolymer | MDI amount (g) | | 500.4 | 372.8 | 296.6 | — |
| | | Trifunctional or higher polyfunctional isocyanate | Type | — | — | — | — |
| | | | Amount (g) | — | — | 0 | — |
| | | Polyol | Type | PBA1000 PBA2000 | PBA1000 PBA2000 | PBA2000 | — |
| | | | Amount (g) | 499.6 | 627.2 | 703.4 | — |
| | Curing agent | Trifunctional or higher polyfunctional alcohol | Type | — | Pentaerythritol | — | — |
| | | | Amount (g) | — | 11.7 | 19.2 | — |
| | | 1,4-BD amount (g) | | 132.2 | 66.3 | 52.0 | — |
| | | Polyol | Type | PHA1000 | PHA1000 | PHA1000 | — |
| | | | Amount (g) | 132.2 | 0.0 | 0.0 | — |
| | | Polycat 46 amount (g) | | 0 | 0 | 0 | — |
| | | No. 25 amount (g) | | 0.25 | 0.25 | 0.25 | — |
| | | Post-treatment | | No | No | UV 8200 mJ/cm$^2$ | — |

TABLE 9-continued

|  |  |  | Comparative example 1 | Comparative example 2 | Comparative example 3 | Comparative example 4 |
|---|---|---|---|---|---|---|
| Elastic modulus | First tapered surface | Mean value (MPa) | 8 | 25 | 850.78 | 72.28 |
|  |  | Standard deviation (MPa) | 2.300 | 6.100 | 45.600 | 86.240 |
|  |  | Coefficient of variation | 28.8 | 24.4 | 5.4 | 119.3 |
|  | Second tapered surface | Mean value (MPa) | 8 | 23 | 850.67 | 72.28 |
|  |  | Standard deviation (MPa) | 2.300 | 5.400 | 46.100 | 86.240 |
|  |  | Coefficient of variation | 28.8 | 23.5 | 5.4 | 119.3 |
| Concentration of trifunctional or higher polyfunctional alcohol (mmol/g) |  | First tapered surface | — | 0.08 | 0.19 | — |
|  |  | Second tapered surface | — | 0.07 | 0.17 | — |
| M2/M1 |  | First tapered surface | — | — | — | — |
|  |  | Second tapered surface | — | — | — | — |
| M3/M1 |  | First tapered surface | 0.1386 | 0.1210 | 0.0969 | — |
|  |  | Second tapered surface | 0.1383 | 0.1208 | 0.0971 | — |
| Evaluation rank of wiping performance |  | Initial | E | D | E | E |
|  |  | After 100,000 wipes | E | E | E | E |
|  |  | After 500,000 wipes | E | E | E | E |

The present disclosure is not limited to the embodiments above, and can accommodate various modifications and alterations without departing from the spirit and scope of the disclosure. Accordingly, the claims below are appended herein to for the purpose of making public the scope of the present disclosure.

What is claimed is:

1. A vehicle windshield wiper blade, comprising:
a blade support portion; and
a lip portion swingably connected to the blade support portion via a neck,
the lip portion having a tapered portion a width of which, in a cross section in a direction perpendicular to a longitudinal direction of the wiper blade, gradually decreases from a side close to the blade support portion towards a direction farthest away from the blade support portion, and
the lip portion having:
a first tapered surface and a second tapered surface that constitute the tapered portion; and
a tip surface which, together with the first tapered surface and the second tapered surface, constitute a first edge and a second edge at a side of the lip portion farthest away from the blade support portion, and
wherien:
assuming that a first line segment is drawn on the first tapered surface parallelly to the first edge at a distance of 10 μm from the first edge;
a length of the first line segment is defined as L1;
points at (1/8)L1, (1/2)L1 and (7/8)L1 from one end side on the first line segment are defined as P0, P1 and P2 respectively; and
when measuring, using a scanning probe microscope, an elastic modulus at 70000 points at a 0.1 μm pitch in each of three rectangular observation regions on the first tapered surface, each of the rectangular observation regions having barycenter at P0, P1 and P2, and having a 70 μm-long side parallel to the first line segment and a 10 μm-long side perpendicularly intersecting the first line segment,
a mean value of the 210000 obtained elastic modulus values being 15 MPa to 470 MPa, and a coefficient of variation of elastic modulus being 17.6% or lower; and
assuming that a second line segment is drawn on the second tapered surface parallelly to the second edge at a distance of 10 μm from the second edge;
a length of the second line segment is defined as L2;
points at (1/8)L2, (1/2)L2 and (7/8)L2 from one end side on the second line segment are defined as P3, P4 and P5 respectively; and
when measuring, using a scanning probe microscope, an elastic modulus at 70000 points at a 0.1 μm pitch in each of three rectangular observation regions on the second tapered surface, each of the rectangular observation regions having barycenters at P3, P4 and P5 and having a 70 μm-long side parallel to the second line segment and a 10 μm-long side perpendicularly intersecting the second line segment,
a mean value of the 210000 obtained elastic modulus values being 15 MPa to 470 MPa, and a coefficient of variation of elastic modulus being 17.6% or lower.

2. The vehicle windshield wiper blade according to claim 1,
wherein: the tapered portion comprises a polyurethane; and
the polyurethane comprises a reaction product of a raw material composition that comprises at least one selected from the group consisting of
an alcohol including a trifunctional or higher polyfunctional alcohol, and
an isocyanate compound including a trifunctional or higher polyfunctional isocyanate.

3. The vehicle windshield wiper blade according to claim 2, wherein the alcohol further comprises a diol.

4. The vehicle windshield wiper blade according to claim 2, wherein the isocyanate compound further comprises a diisocyanate.

5. The vehicle windshield wiper blade according to claim 4,
wherein assuming that:
respective line segments are drawn on the first tapered surface and on the second tapered surface of the tapered portion parallelly to the first edge and the second edge at a distance of 0.5 mm from the first edge and the second edge respectively,
a length of each of the line segments are defined as L',
points at ⅛L', ½L' and ⅞L' from one end side on each of the line segments are defined as P0', P1' and P2' respectively, and
when samples sampled at P0', P1' and P2' on the first tapered surface and the second tapered surface are heated up to 1000° C. at a temperature rise rate of 10°

C./s by using a mass spectrometer of a direct sample introduction type in which each of the samples are heated and vaporized in an ionization chamber and molecules of each of the samples are ionized, M2/M1 is 0.0010 to 0.0150, and M3/M1 is 0.0200 to 0.1100, at the first tapered surface; and M2/M1 is 0.0010 to 0.0150 and M3/M1 is 0.0200 to 0.1100, at the second tapered surface, where: M1 is a detected amount of all ions;

M2 is an integrated intensity of a peak in an extracted ion thermogram corresponding to a range of an m/z value derived from the trifunctional or higher polyfunctional isocyanate; and M3 is an integrated intensity of a peak in an extracted ion thermogram corresponding to a range of an m/z value derived from the diisocyanate.

6. The vehicle windshield wiper blade according to claim 2, wherein assuming that:

respective line segments are drawn on the first tapered surface and on the second tapered surface of the tapered portion, parallelly to the first edge and the second edge at a distance of 0.5 mm from the first edge and the second edge respectively, a length of each of the line segments is defined as L', points at $\frac{1}{8}$L', $\frac{1}{2}$L' and $\frac{7}{8}$L' from one end side on the line segment are defined as P0', P1' and P2' respectively;

when samples sampled at P0', P1' and P2' on the first tapered surface and the second tapered surface are subjected to a measurement by pyrolysis GC/MS, a concentration of the trifunctional or higher polyfunctional alcohol in the polyurethane, on the first tapered surface, is 0.04 mmol/g to 0.39 mmol/g; and a concentration of the trifunctional or higher polyfunctional alcohol in the polyurethane, on the second tapered surface, is 0.04 mmol/g to 0.39 mmol/g.

7. The vehicle windshield wiper blade according to claim 2, wherein the trifunctional or higher polyfunctional alcohol comprises at least one selected from the group consisting of trimethylolpropane and glycerin.

8. The vehicle windshield wiper blade according to claim 2, wherein the trifunctional or higher polyfunctional isocyanate is at least one selected from the group consisting of triphenylmethane-4,4',4''-triisocyanate (TTI), tris(phenylisocyanate)thiophosphate (TPTI) and polymeric MDI.

9. The vehicle windshield wiper blade according to claim 1, wherein: in a measurement of the elastic modulus on the first tapered surface, the mean value of elastic modulus values is 32 MPa to 62 MPa; and in a measurement of the elastic modulus on the second tapered surface, the mean value of elastic modulus values is 32 MPa to 62 MPa.

10. The vehicle windshield wiper blade according to claim 1, wherein: in a measurement of the elastic modulus on the first tapered surface, the coefficient of variation of elastic modulus is 6.0% or lower; and in a measurement of the elastic modulus on the second tapered surface, the coefficient of variation of elastic modulus is 6.0% or lower.

* * * * *